(12) United States Patent
Maroulis

(10) Patent No.: US 11,646,953 B2
(45) Date of Patent: May 9, 2023

(54) IDENTIFICATION OF NETWORK ISSUES BY CORRELATION OF CROSS-PLATFORM PERFORMANCE DATA

(71) Applicant: SPLUNK INC., San Francisco, CA (US)

(72) Inventor: Nikolaos Maroulis, Salinas, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 16/541,540

(22) Filed: Aug. 15, 2019

(65) Prior Publication Data
US 2019/0372868 A1     Dec. 5, 2019

Related U.S. Application Data

(63) Continuation of application No. 14/609,641, filed on Jan. 30, 2015, now Pat. No. 10,469,346.

(51) Int. Cl.
*H04L 43/065* (2022.01)
*H04L 41/0631* (2022.01)
(Continued)

(52) U.S. Cl.
CPC ........ *H04L 43/065* (2013.01); *G06F 11/3006* (2013.01); *G06F 11/3072* (2013.01); *H04L 41/065* (2013.01); *H04L 41/0631* (2013.01); *H04L 43/04* (2013.01); *H04L 63/1416* (2013.01); *H04L 67/00* (2013.01);
(Continued)

(58) Field of Classification Search
None
See application file for complete search history.

(56) References Cited

U.S. PATENT DOCUMENTS 7,849,183 B1 * 12/2010 Haber ................... H04L 67/125
                                                          709/224
8,447,851 B1    5/2013 Anderson et al.
(Continued)

FOREIGN PATENT DOCUMENTS

WO   WO-2008116087 A1 *  9/2008 ............. G06F 21/10

OTHER PUBLICATIONS

Advisory Action dated Jul. 30, 2018 for U.S. Appl. No. 14/609,641 of N. Maroulis, filed Jan. 30, 2015.
(Continued)

*Primary Examiner* — Lance Leonard Barry
(74) *Attorney, Agent, or Firm* — Perkins Coie LLP

(57) ABSTRACT

A data intake and query system collects performance data from client devices and host devices and stores the performance data in one or more indexes. The system is further configured to facilitate correlation of the performance data collected from the client devices and the separate performance data collected from the host devices. For example, based on a determination that one or more identifiers stored in a portion of performance data received from client devices match one or more identifiers stored in a portion of the performance data received from host devices, a data intake and query may determine that the data portions are related. The portions of performance data, for example, may correspond to events the data intake and query system derives from the performance data collected from both client devices and host devices.

29 Claims, 16 Drawing Sheets

(51) Int. Cl.
  *H04L 43/04* (2022.01)
  *H04L 9/40* (2022.01)
  *G06F 11/30* (2006.01)
  *H04L 67/00* (2022.01)
  *H04L 67/568* (2022.01)
  *H04L 67/5681* (2022.01)

(52) U.S. Cl.
  CPC ........ *H04L 67/568* (2022.05); *H04L 67/5681* (2022.05); *G06F 2201/86* (2013.01); *G06F 2201/865* (2013.01)

(56) References Cited

U.S. PATENT DOCUMENTS

| | | | |
|---|---|---|---|
| 8,572,427 B1* | 10/2013 | Stancu-mara | H04L 41/0686 714/4.1 |
| 8,848,528 B1 | 9/2014 | Fan et al. | |
| 8,990,637 B1 | 3/2015 | Vlachogiannis et al. | |
| 8,996,695 B2 | 3/2015 | Anderson et al. | |
| 9,344,465 B2 | 5/2016 | Stern et al. | |
| 9,438,645 B2 | 9/2016 | Stern et al. | |
| 9,705,769 B1* | 7/2017 | Sarangapani | G06F 11/3414 |
| 10,469,346 B2* | 11/2019 | Maroulis | H04L 69/02 |
| 10,791,367 B1* | 9/2020 | Ganjam | H04N 21/44204 |
| 2006/0041869 A1* | 2/2006 | Houston | G06Q 10/06 717/131 |
| 2006/0085420 A1 | 4/2006 | Hwang | |
| 2007/0036055 A1* | 2/2007 | Ito | G11B 19/04 369/53.35 |
| 2007/0266149 A1* | 11/2007 | Cobb | H04L 41/5009 709/224 |
| 2009/0113242 A1 | 4/2009 | Miller et al. | |
| 2010/0088404 A1 | 4/2010 | Mani et al. | |
| 2010/0131587 A1* | 5/2010 | Zenz | G06F 9/52 709/203 |
| 2011/0179016 A1 | 7/2011 | Narula et al. | |
| 2012/0005205 A1 | 1/2012 | Bobick et al. | |
| 2012/0036399 A1 | 2/2012 | Howard | |
| 2012/0047135 A1 | 2/2012 | Hansson et al. | |
| 2013/0262643 A1 | 10/2013 | Anderson et al. | |
| 2013/0326607 A1* | 12/2013 | Feng | G06F 21/31 726/7 |
| 2014/0136680 A1 | 5/2014 | Joshi et al. | |
| 2014/0358991 A1 | 12/2014 | Laver et al. | |
| 2015/0067031 A1 | 3/2015 | Acharya et al. | |
| 2015/0113052 A1* | 4/2015 | Chen | H04L 67/16 709/203 |
| 2016/0077910 A1* | 3/2016 | Dev | G06F 11/34 714/4.3 |
| 2016/0124793 A1* | 5/2016 | Ruan | G06F 11/079 714/37 |
| 2016/0147830 A1 | 5/2016 | Zhong et al. | |
| 2016/0241428 A1 | 8/2016 | Stern et al. | |
| 2016/0344585 A1 | 11/2016 | Stern et al. | |
| 2019/0372868 A1* | 12/2019 | Maroulis | H04L 67/2842 |

OTHER PUBLICATIONS

Ex Parte Quayle Action mailed on Mar. 1, 2019 for U.S. Appl. No. 14/609,641 of N. Maroulis, filed Jan. 30, 2015.
Final Office Action dated May 25, 2018 for U.S. Appl. No. 14/609,641 of N. Maroulis, filed Jan. 30, 2015.
Non-Final Office Action dated Jul. 14, 2017 for U.S. Appl. No. 14/609,641 of N. Maroulis, filed Jan. 30, 2015.
Non-Final Office Action dated Oct. 9, 2018 for U.S. Appl. No. 14/609,641 of N. Maroulis, filed Jan. 30, 2015.
Notice of Allowance dated Jun. 19, 2019 for U.S. Appl. No. 14/609,641 of N. Maroulis, filed Jan. 30, 2015.

* cited by examiner

FIG. 7B

| | | | | | | | | |
|---|---|---|---|---|---|---|---|---|
| INCIDENT REVIEW \| Actions ▾ | | | | | | | | |
| Status: | | Urgency: high | | Owner: | | Title: | 811 | |
| Security domain: 🔍 | | Governance: pci | | Search: | | 24 hour window ▾ — 812 | ☐☐ Save▾ Create▾ | |
| | | | | | | | Last 15 minutes | |
| | | | | | | | Last 60 minutes | Linear scale ▾ 1bar=1hour |
| ✓ 225 matching events | | | | | | | Last 4 hours | |
| ☐ Hide ⌕ Zoom out ⌕ Zoom to selection [ ]Deselect | | | | | | | Last 24 hours | 120 |
| 120 | | | | | | | Last 7 days | 60 |
| 60 | | | | | | | Last 30 Days | 813 |
| | | | | | | | Last year | |
| 4:00AM | | 6:00AM | | | | 8: | Real-time | 10:00AM |
| Sun Aug 26 2012 | | | | | | | | |
| 225 events in a 24 hour window (real-time)(from 11:29:20 AM August 25 to 11:29:20 AM August 26,2012) 814 | | | | | | | | |
| Select all \| Unselect all ‹prev 1 2 3 4 5 6 7 8 9 10 next▸ \| Edit selected events \| Edit all 225 matching events | | | | | | | | |
| Select | Options | Time | Security Domain | Title | | Urgency | Status | Owner |
| ☐ | ▶ | 8/26/12 11:11:03.000AM | Access ▾ | Insecure Or Cleartext Authentication Detected ▾ | | ①High ▾ | New ▾ | unassigned ▾ View details |
| ☐ | ▶ | 8/26/12 11:10:07.000AM | Access ▾ | Insecure Or Cleartext Authentication Detected ▾ | | ①High ▾ | New ▾ | unassigned ▾ View details |
| ☐ | ▶ | 8/26/12 11:00:39.000AM | Access ▾ | Account (blinebry) Deleted on (PROD-POS-001) ▾ | | ①High ▾ | New ▾ | unassigned ▾ View details |
| ☐ | ▶ | 8/26/12 11:00:39.000AM | Access ▾ | Account (beu) Deleted on (COREDEV-006) ▾ | | ①High ▾ | New ▾ | unassigned ▾ View details |
| ☐ | ▶ | 8/26/12 11:00:39.000AM | Access ▾ | Account (combs) Deleted on (HOST-005) ▾ | | ①High ▾ | New ▾ | unassigned ▾ View details |

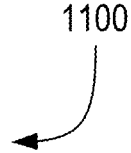

```
{
    apiKey: b44e92j
    appVersionCode: 6
    appVersionName: 1.0.9
    carrier: AT&T
    connection: 3G
    device: Google Nexus 4
    exception: NA
    extraData: { }
    failed: false
    latency: 1253
    locale: RU
    gps: 32.84211, -96.64471
    osVersion 4.2
    packageName: com.foo.app
    platform: Android
    protocol: HTTP
    remoteIP: 135.138.106.130
    requestLength: 225
    responseLength: 4098
    sdkVersion: 0.1
    state: CONNECTED
    statusCode: 200
    url: api.foo.com/order
    userIdentifier: user@foo.com
    instanceIdentifier: a123
    sessionIdentifier: 130
}
```

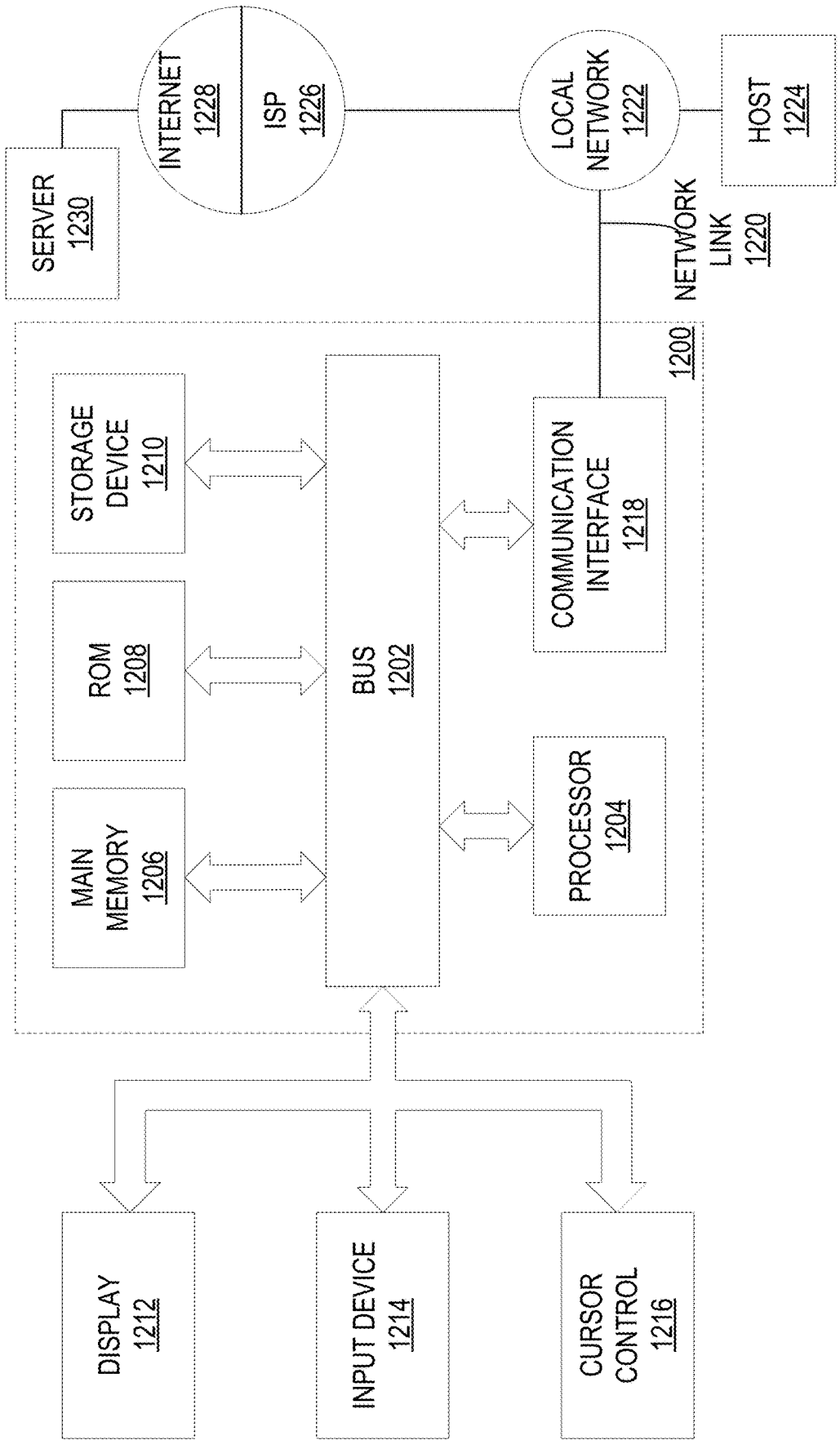

IDENTIFICATION OF NETWORK ISSUES BY CORRELATION OF CROSS-PLATFORM PERFORMANCE DATA

This application is a continuation of U.S. patent application Ser. No. 14/609,641, filed on Jan. 30, 2015, which is incorporated by reference herein its entirety.

FIELD OF THE DISCLOSURE

The present disclosure generally relates to collecting performance data from client devices and host devices communicating over a network and correlating portions of the collected data for presentation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, many types of computing services rely on communication between client devices and host devices over one or more networks such as the public Internet. For example, users commonly use a wide variety of client devices (e.g., desktop and laptop computers, smartphones, tablet computers, etc.) to access many different types of network-based services, including websites, social networking platforms, media hosting services, and so forth. Typically, a client device accesses a network-based service by sending one or more network messages to host devices providing the services, which in turn process the network messages and return requested resources to the client devices. While such network-based services have greatly expanded the opportunity for new types of computing applications, use of these services may involve an increased number of possible points of failure in comparison to offline applications, including at the client device, at one or more networks connecting client devices to host devices, and among any number of host devices responsible for processing client device requests.

If an administrator of a network-based service is made aware of an issue experienced by one or more users accessing the service (e.g., an inability of users to access the service, slow performance, etc.), the administrator typically may investigate the problem by reviewing one or more log files or other diagnostic information generated by the host devices implementing the service. Such information may enable the administrator to troubleshoot various configuration or other issues related to the operation of the host devices. However, if the issue stems from a problem with a client device or a performance issue with one or more intermediary networks, the administrator typically has little to no means of investigating and diagnosing such issues since the administrator does not have direct access to those components.

Another issue complicating administration of network-based services is that an increasingly diverse set of client device types are used to access network-based services. Each of these types of devices may connect to host devices using a number of different network connection types (e.g., Ethernet, Wi-Fi, cellular networks, etc.) whose capabilities may vary widely depending on a particular type of connection, a current geographic location of the client device, particular software installed on the device, and any number of other variables. The diversity of client device types and network infrastructures connecting client devices to network-based services presents a number of challenges for a network-based service provider to provide a consistent experience across all client devices and to diagnose issues experienced by particular users of the service when they arise.

BRIEF DESCRIPTION OF THE DRAWINGS

In the drawings:

FIG. 7B illustrates a data summary dialog that enables a user to select various data sources in accordance with the disclosed embodiments;

FIG. 8B illustrates an incident review dashboard in accordance with the disclosed embodiments;

FIG. 11 depicts an example of performance data generated by a client device, according to an embodiment of the invention; and FIG. 12 is a block diagram of a computer system upon which embodiments may be implemented.

DETAILED DESCRIPTION

Figure 1:
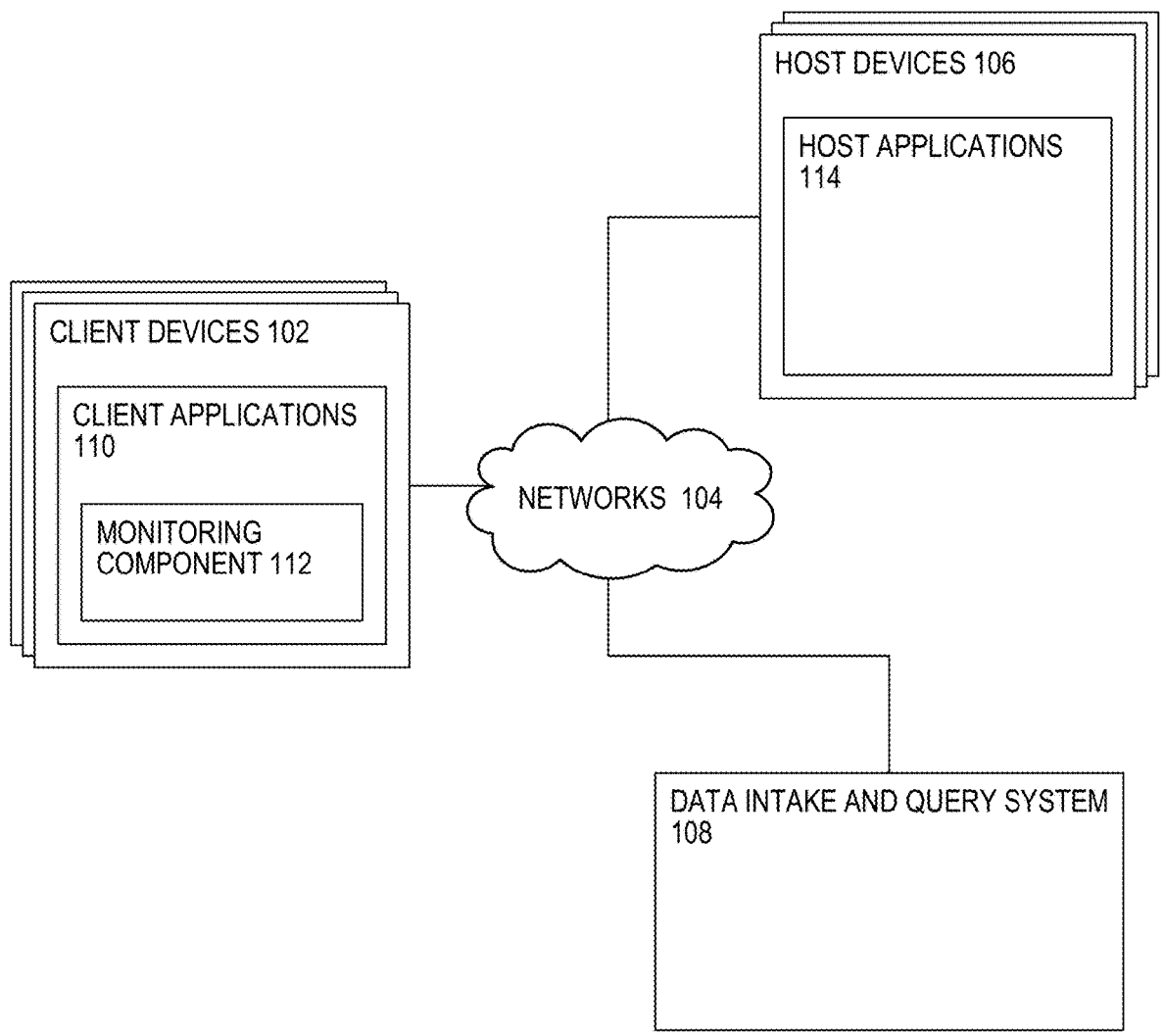
FIG. 1 illustrates a networked computer environment in which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Operating Environment
  2.1. Host Devices
  2.2. Client Devices
  2.3. Client Device Applications
  2.4. Data Intake and Query System Overview
  2.5. Data Server System
  2.6. Data Ingestion
    2.6.1. Input
    2.6.2. Parsing
    2.6.3. Indexing
  2.7. Query Processing
  2.8. Field Extraction
  2.9. Example Search Screen
  2.10. Acceleration Techniques
    2.10.1. Map-Reduce Technique
    2.10.2. Keyword Index
    2.10.3. High Performance Analytics Store
    2.10.4. Accelerating Report Generation
  2.11. Security Features
  2.12. Data Center Monitoring
  2.13. Cloud-Based System Overview
3.0 Functional Overview
  3.1. Collecting Client Device Performance Data
  3.2. Collecting Host Device Performance Data
  3.3. Correlating Performance Data
  3.4. Presenting Correlated Performance Data
4.0. Implementation Mechanisms—Hardware Overview
5.0. Example Embodiments
6.0. Extensions and Alternatives 1.0. General Overview This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

According to various embodiments, systems and techniques are described for collecting performance data from both host devices and client devices which interact with the host devices over a network, and enabling correlation of the collected performance data to facilitate analysis of interactions among the devices. As used herein, performance data broadly refers to data indicating network performance statistics, information related to a device's operating state, or any other data that may be collected by a client and/or host device during operation.

In general, an application executing on a client device may interact with one or more host devices by generating and sending data packets over a network. For example, an application executing on a smartphone may access a website or other network-based service hosted by one or more host devices by sending data packets to the host devices formatted according to the Hypertext Transfer Protocol (HTTP) protocol. The data packets may, for example, include a request for one or more resources, and a host device receiving the data packets may process the requests and respond to the client device with the requested resources.

In one embodiment, a client device is configured to generate performance data during operation of the device, including during the client device's interactions with one or more host devices, and to send the performance data to a data intake and query system. The performance data generated by a client device may include a variety of information relating to the operation of the client device, including network performance information (e.g., latency information, a current connection type, a network carrier), information about the client device itself (e.g., a device manufacturer and model, an installed operating system, application version information), and information about the current operating state of the client device (e.g., memory performance information, wireless signal strength, a physical location of the device). Performance data sent by a client device to a data intake and query system may further comprise one or more identifiers, where each identifier may identify a user of the client device, the client device itself, or one or more applications or other components thereof. In an embodiment, some or all of these identifiers are also included in one or more of the data packets sent to host devices, for example, included in one or more network packet headers.

In an embodiment, one or more host devices may be configured to receive data packets sent from client devices or other host devices, to extract one or more identifiers included in one or more of the data packets, and to store the extracted identifiers in association with performance data generated by the host device. Performance data generated by a host device similarly may provide various information about the operation of the host device at particular times and be stored in one or more log files or other types of machine-generated data. In an embodiment, the host devices also send the performance data, including the one or more extracted identifiers, to the data intake and query system.

A data intake and query system collects performance data from client devices and host devices and stores the performance data in one or more indexes. In an embodiment, the system is further configured to facilitate correlation of the performance data collected from the client devices and the separate performance data collected from the host devices. For example, based on a determination that one or more identifiers stored in a portion of performance data received from client devices match one or more identifiers stored in a portion of the performance data received from host devices, a data intake and query may determine that the data portions are related. In one embodiment, the portions of performance data may correspond to events the data intake and query system derives from the performance data collected from both client devices and host devices.

Based on the correlated data, a data intake and query system may generate one or more displays, reports, alerts, or other interfaces including information from both the client device performance data and the host device performance data. For example, an interface may include a display listing events containing information related to performance of a client device and one or more host devices during related interactions among the devices. In this manner, an end-to-end view of interactions between client devices and host devices is provided. This information may enable network-based service administrators, application developers, and other users to more easily diagnose performance issues and other variables affecting the quality of network-based services.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. Operating Environment

FIG. 1 illustrates a networked computer system 100 in which an embodiment may be implemented. FIG. 1 represents on example embodiment that is provided for purposes of illustrating a clear example; other embodiments may use different arrangements.

The networked computer system 100 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or internetworks using any of wired, wireless, terrestrial microwave, or satellite links, and may include the public Internet.

2.1. Host Devices

In an embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. For example, each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include various request and response packets. For example, in general, a client device 102 may initiate communication with a host application 114 by making a request for a specific resource (e.g., based on an HTTP request), and the application server may respond with the requested content stored in one or more response packets.

In an embodiment, one or more host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising database server may generate one or more logs that record information related to requests sent from other host applications 114 (e.g., web servers or application servers) for data managed by the database server.

2.2. Client Devices

Client devices 102 of FIG. 1 broadly represent any computing device capable of interacting with one or more host devices 106 via a network 104. Examples of client devices 102 may include, without limitation, smart phones, tablet computers, other handheld computers, wearable devices, laptop computers, desktop computers, servers, portable media players, gaming devices, and so forth. In general, a client device 102 can provide access to different content, for instance, content provided by one or more host devices 106. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser which a user may navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on to the application. Monitoring component 112 may also be a stand-alone process.

In one embodiment, a monitoring component 112 may be created when a client application 110 is initially developed, for example, by an application developer using a software development kit (SDK). The SDK may, for example, include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code such that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or aspects of network traffic sent and/or received by a client application 110. For example, the monitoring component 112 may be configured to monitor data packets transmitted to and/or from one or more host application 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be provided to a data intake and query system 108 for analysis.

Upon developing a client application 110 that incorporates a monitoring component 112, the client application 110 can be distributed to client devices 102. Applications generally can be distributed to client devices 102 in any manner. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, which issued as U.S. Pat. No. 9,838,292 on Dec. 5, 2017, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field in which a value is stored indicating a network latency measurement associated with one or more network requests, a "state" field to store a value indicating a state of a network connection, and so forth for any number of aspects of collected performance data.

FIG. 11 illustrates an example performance data record including performance data items that may be generated by a monitoring component 112 of a client device 102. The data record 1100, for example, includes several field-value pairs that provide various items of performance data which relate to a client device 102 that generated the record. The data record 1100 includes several data items that provide information about various software applications installed on the client device. For example, an "appVersionCode" and "appVersionName" field store values identifying a product version and name corresponding to client application 110. Similarly, an "osVersion" field stores a value indicating a version of an operating system executing on the client device. A "packageName" field, for example, stores a value identifying a portion of the code of client application 110 that triggered the monitoring.

The data record 1100 further includes several data items that relate to a current operating state of the client device generating the record. For example, a "carrier" field stores a value identifying a current provider of a network service used by the client device to connect to a network 104. A "connection" field stores a value indicating a current type of network connection (e.g., 3G, 4G, or Wi-Fi) the client device using. A "locale" field stores a value identifying a geographic location (e.g., "RU" indicating Russia) at which a client device 102 is currently operating. A "gps" field stores a value identifying a more specific geographic location at which the client device is currently operating, which may be based in part on Global Positioning System (GPS) data obtained from the client device, based on a triangulation estimate in reference to one or more cell tower locations, or derived from any other location data.

The example data record 1100 further includes fields that are configured to store various items of network performance information. For example, the network performance information may relate to one or more network events which triggered generation of the data record, or that occurred during a time period of device monitoring. In the example data record of FIG. 11, for example, a "latency" field is associated with a value of 1253, indicating that one or more network requests were associated with a latency of approximately 1.2 seconds. A "remoteIP" field stores an IP address of a client device 102, host device 106 or other device to which one or more network messages were sent or received. Among other uses, a "remoteIP" value may be used, for example, to determine an approximate geographic location of a client device 102 when GPS information is unavailable (e.g., due to absent or disabled GPS functionality in a client device, poor reception, etc.) A "requestLength" field stores a value indicating a length of a request message and, similarly, a "responseLength" field stores a value indicating a length of a response message received. A "state" field stores a value indicating the state of a connection (e.g., CONNECTED or FAILED) A "statusCode" field stores a value indicating an HTTP status code related to a particular request. A "url" field stores a string indicating a URL included in a request sent by client application 110. An "extraData" field stores any custom data a developer of a client application 110 may desire to track in addition to the other provided fields.

The example data record 1100 further includes fields that are configured to store one or more identifiers. For example, data record 1100 includes each of a "userIdentifier" field storing a value identifying a particular user of a client application 110, an "instanceIdentifier" field storing a value that identifies a particular instance of a client application 110, and a "sessionIdentifier" field storing a value that identifies a particular application session.

2.4. Data Intake and Query System Overview

Data intake and query system 108 generally represents a data analysis system that is configured to consume and analyze machine-generated data, such as performance data that may be generated by one or more client devices 102 and/or host devices 106. Analyzing massive quantities of machine data, such as performance data that may be generated by a large number of client devices 102 and host devices 106, presents a number of challenges, including ingesting the large quantities of data that may be generated by the client and host devices, and storing the data in a manner that enables efficient analysis.

In one embodiment, these challenges can be addressed by using an event-based data intake and query system, such as the SPLUNK® ENTERPRISE system produced by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing unstructured data, which is commonly found in system and application log files, network data, and other data input sources. Although many of the techniques described herein are explained with reference to a data intake and query system similar to the SPLUNK® ENTERPRISE system, the techniques are also applicable to other types of data systems.

In the SPLUNK® ENTERPRISE system, machine-generated data is collected and stored as "events," where each event comprises a portion of the machine-generated data and is associated with a specific point in time. For example, events may be derived from "time series data," where the time series data comprises a sequence of data points (e.g., performance measurements from a computer system) that are associated with successive points in time. In general, each event may be associated with a timestamp that is derived from the raw data in the event, determined through interpolation between temporally proximate events having known timestamps, or determined based on other configurable rules for assigning timestamps to events.

Events can be derived from either "structured" or "unstructured" machine data. In general, structured data has a predefined format, where data items with specific data formats are stored at predefined locations in the data. For example, structured data may include data stored as fields in a database table. In contrast, unstructured data may not have a predefined format. This means that unstructured data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events may be derived include, but are not limited to, web servers, application servers, databases, firewalls, routers, operating systems, and software applications that execute on computer systems, mobile devices, and sensors. The data generated by such data sources can include, for example and without limitation, server log files, activity log files, configuration files, messages, network packet data, performance measurements, and sensor measurements.

The SPLUNK® ENTERPRISE system also facilitates using a flexible schema to specify how to extract information from the event data, where the flexible schema may be developed and redefined as needed. Note that a flexible schema may be applied to event data "on the fly," when it is needed (e.g., at search time, etc.), rather than at ingestion time of the data as in traditional database systems. Because the schema is not applied to event data until it is needed (e.g., at search time, etc.), it may be referred to as a "late-binding schema."

During operation, the SPLUNK® ENTERPRISE system starts with raw input data (e.g., one or more log files, a stream of network data, sensor data, any data stream, etc.). The system divides this raw data into blocks, and parses the data to produce timestamped events. The system stores the timestamped events in one or more data stores, and enables users to run queries against the stored data to retrieve events that meet criteria specified in a query, such as containing certain keywords or having specific values in defined fields. In this context, the term "field" refers to a location in the event data containing a value for a specific data item.

As noted above, the SPLUNK® ENTERPRISE system facilitates using a late-binding schema while performing queries on events. One aspect of a late-binding schema is "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule." In the SPLUNK® ENTERPRISE system, a field extractor may be configured to automatically generate extraction rules for certain fields in the events when the events are being created, indexed, or stored, or possible at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or modifying the field extraction rules for use the next time the schema is used by the system. Because the SPLUNK® ENTERPRISE system maintains the underlying raw data and provides a late-binding schema for searching the raw data, it enables an analyst to investigate questions that arise as the analyst learns more about the events.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

2.5. Data Server System

Figure 2:
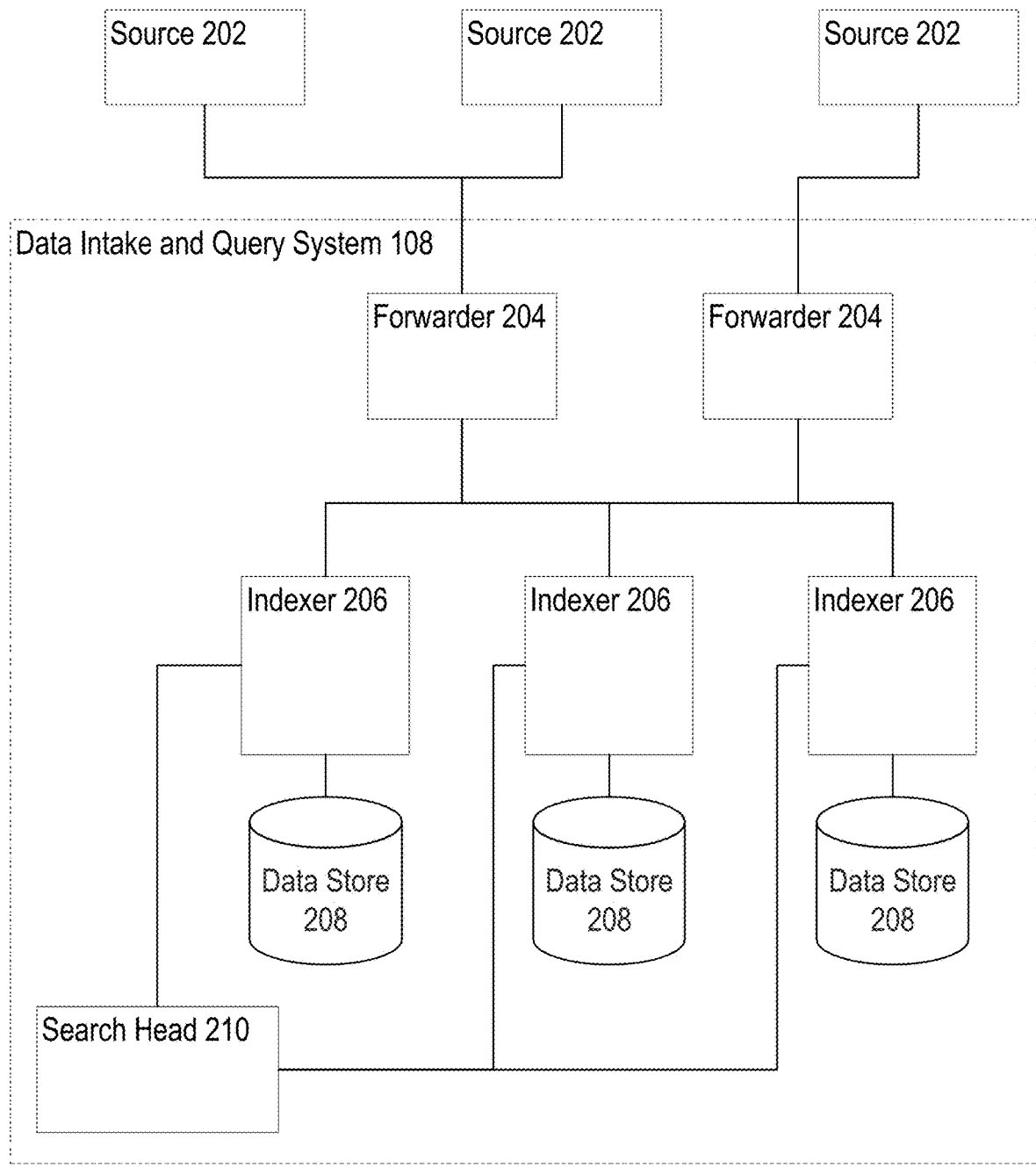
FIG. 2 illustrates a block diagram of an example data intake and query system in which an embodiment may be implemented.

FIG. 2 depicts a block diagram of an example data intake and query system 108, similar to the SPLUNK® ENTERPRISE system. System 108 includes one or more forwarders 204 that consume data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a source of data can be consumed by a system 108. Examples of a data source 202 include, without limitation, data files, directories of files, data sent over a network, event logs, and registries.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. Techniques for efficiently forwarding data through a data forwarder are described in U.S. Provisional Appl. 62/053,101, entitled "DATA FORWARDING USING MULTIPLE DATA PIPELINES", filed on 19 Sep. 2014, and which is hereby incorporated by reference in its entirety for all purposes.

2.6. Data Ingestion

Figure 3:
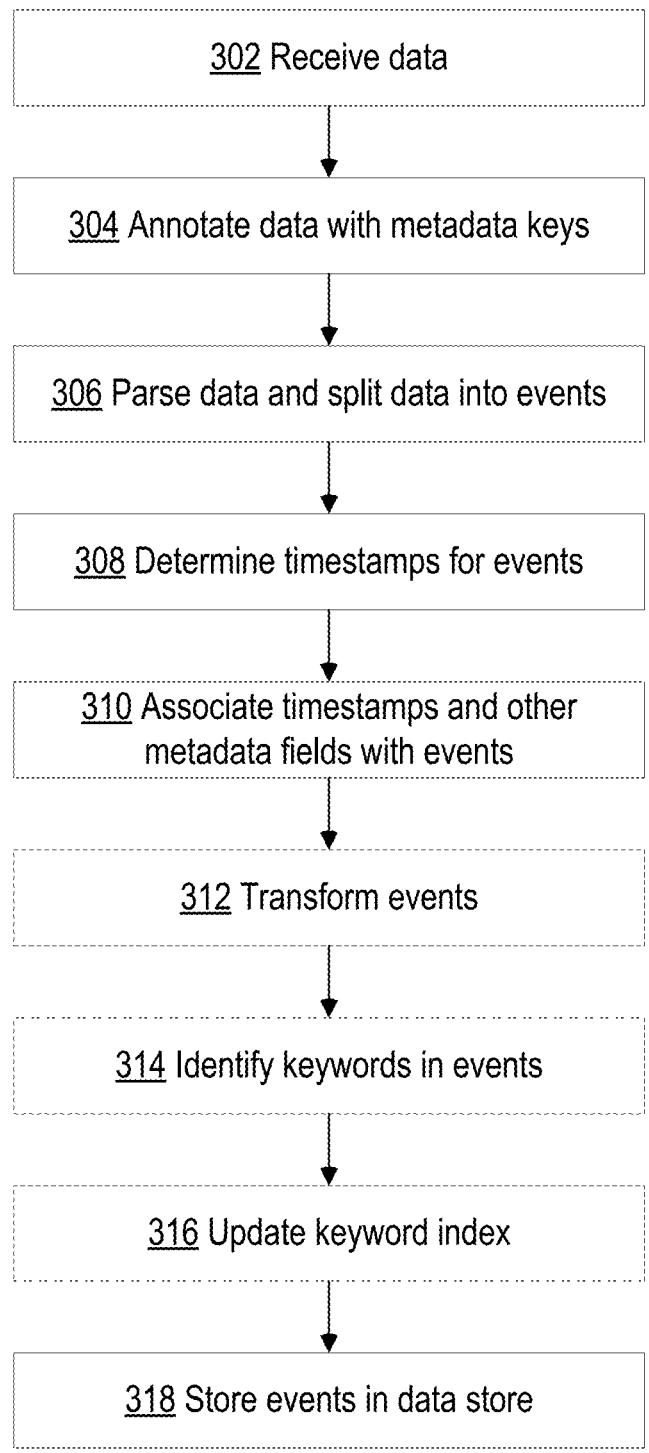
FIG. 3 is a flow diagram that illustrates how indexers process, index, and store data received from forwarders in accordance with the disclosed embodiments.

FIG. 3 depicts a flow chart illustrating an example data flow within a data intake and query system 108, in accordance with the disclosed embodiments. The data flow illustrated in FIG. 3 is provided for illustrative purposes only; one or more of the steps of the processes illustrated in FIG. 3 may be removed or the ordering of the steps may be changed. Furthermore, for the purposes of illustrating a clear example, one or more particular system components is described as performing various operations during each of the data flow stages. For example, a forwarder is described as receiving and processing data during an input phase, an indexer is described as parsing and indexing data during parsing and indexing phases, and a search head is described as performing a search query during a search phase. However, it is noted that other system arrangements and distributions of the processing steps across system components may be used.

2.6.1. Input

At block 302, a forwarder receives data from an input source. A forwarder, for example, initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks," possibly of a uniform data size, to facilitate subsequent processing steps.

At block 304, a forwarder or other system component annotates each block generated from the raw data with one or more metadata fields. These metadata fields may, for example, provide information related to the data block as a whole and which apply to each event that is subsequently derived from the data block, as described in more detail below. For example, the metadata fields may include separate fields specifying each of a host, a source, and a source type related to the data block. A host field, for example, may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data if known, and possibly other values that provide information relevant to later processing steps. In an embodiment, a forwarder forwards the data to another system component for further processing, typically forwarding the annotated data blocks to an indexer.

2.6.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block) and refer to a source type configuration corresponding to the identified source type. The source type definition may include one or more properties that indicate to the indexer what are the boundaries of events in the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, or line breaks. If a source type for the data is unknown to the indexer, an indexer may infer a source type for the data by examining the structure of the data and apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, or based on any other rules for determining timestamps.

At block 310, the indexer associates with each event one or more metadata fields including a field containing the timestamp determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field in addition to a field storing the timestamp.

At block 312, an indexer may optionally apply one or more transformations to data included in the events created at block 306. For example, such transformations can include removing a portion of an event (e.g., a portion used to define event boundaries, other extraneous text, etc.), masking a portion of an event (e.g., masking a credit card number), or removing redundant portions of an event. The transformations applied to event data may, for example, be specified in one or more configuration files and referenced by one or more source type definitions.

2.6.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events in a data store, where a timestamp can be stored with each event to facilitate searching for events based on a time range. In one embodiment, the stored events are organized into "buckets," where each bucket stores events associated with a specific time range based on the timestamps associated with each event. This may not only improve time-based searching, but also allow for events with recent timestamps, which may have a higher likelihood of being accessed, to be stored in faster memory to facilitate faster retrieval. For example, buckets containing the most recent events can be stored as flash memory instead of on hard disk.

Each indexer 206 may be responsible for storing and searching a subset of the events contained in a corresponding data store 208. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812, filed on 30 Apr. 2014, and in U.S. patent application Ser. No. 14/266,817, also filed on 30 Apr. 2014, each of which is hereby incorporated by reference in its entirety for all purposes.

2.7. Query Processing

Figure 4:
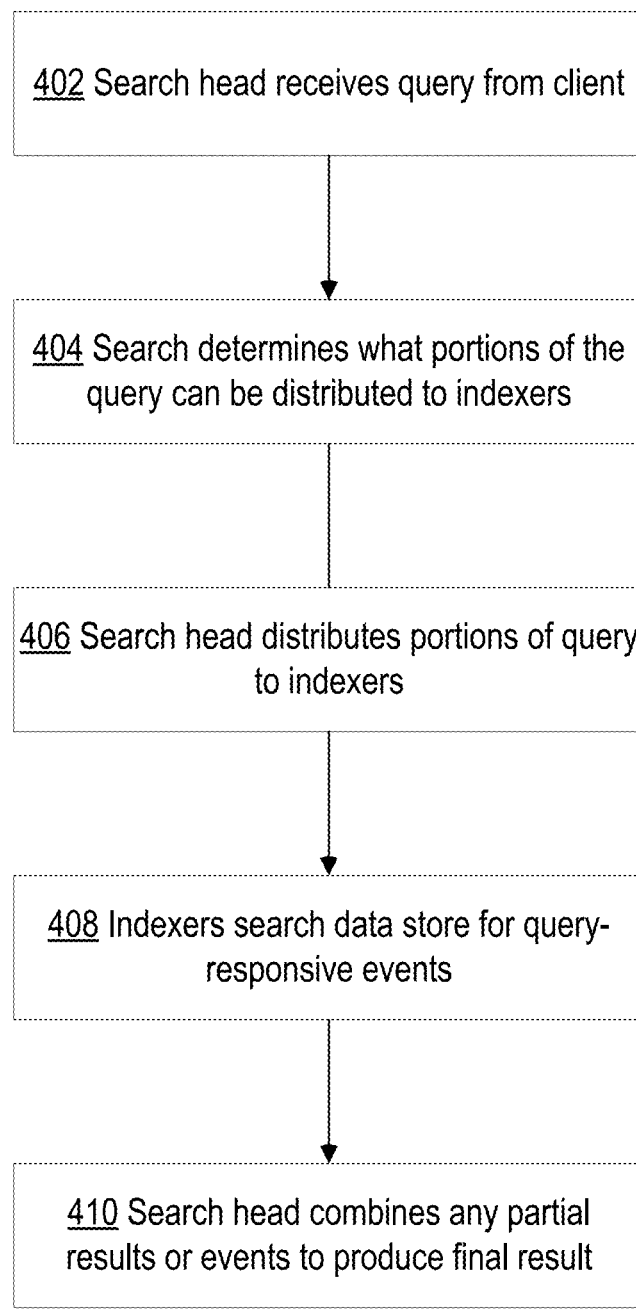
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portions can be delegated to indexers and what portions can be executed locally by the search head. At block 406, the search head distributes the determined portions of the query to the appropriate indexers.

At block 408, the indexers to which the query was distributed search their data stores for events that are responsive to the query. To determine which events are responsive to the query, the indexer searches for events that match the criteria specified in the query. This criteria can include matching keywords or specific values for certain fields. In searches that use a late-binding schema, the searching operations at block 408 may involve using the late-binding schema to extract values for specified fields from events at the time the query is processed. In an embodiment, one or more rules for extracting field values may be specified as part of a source type definition. The indexers may then either send the relevant events back to the search head, or use the events to calculate a partial result, and send the partial result back to the search head.

At block 410, the search head combines the partial results and/or events received from the indexers to produce a result for the query. This result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results back to a client in real-time as they are identified. Another technique waits to report the results to the client until a complete set of results is ready to return to the client. Yet another technique streams interim results back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results.

2.8. Field Extraction

Figure 5:
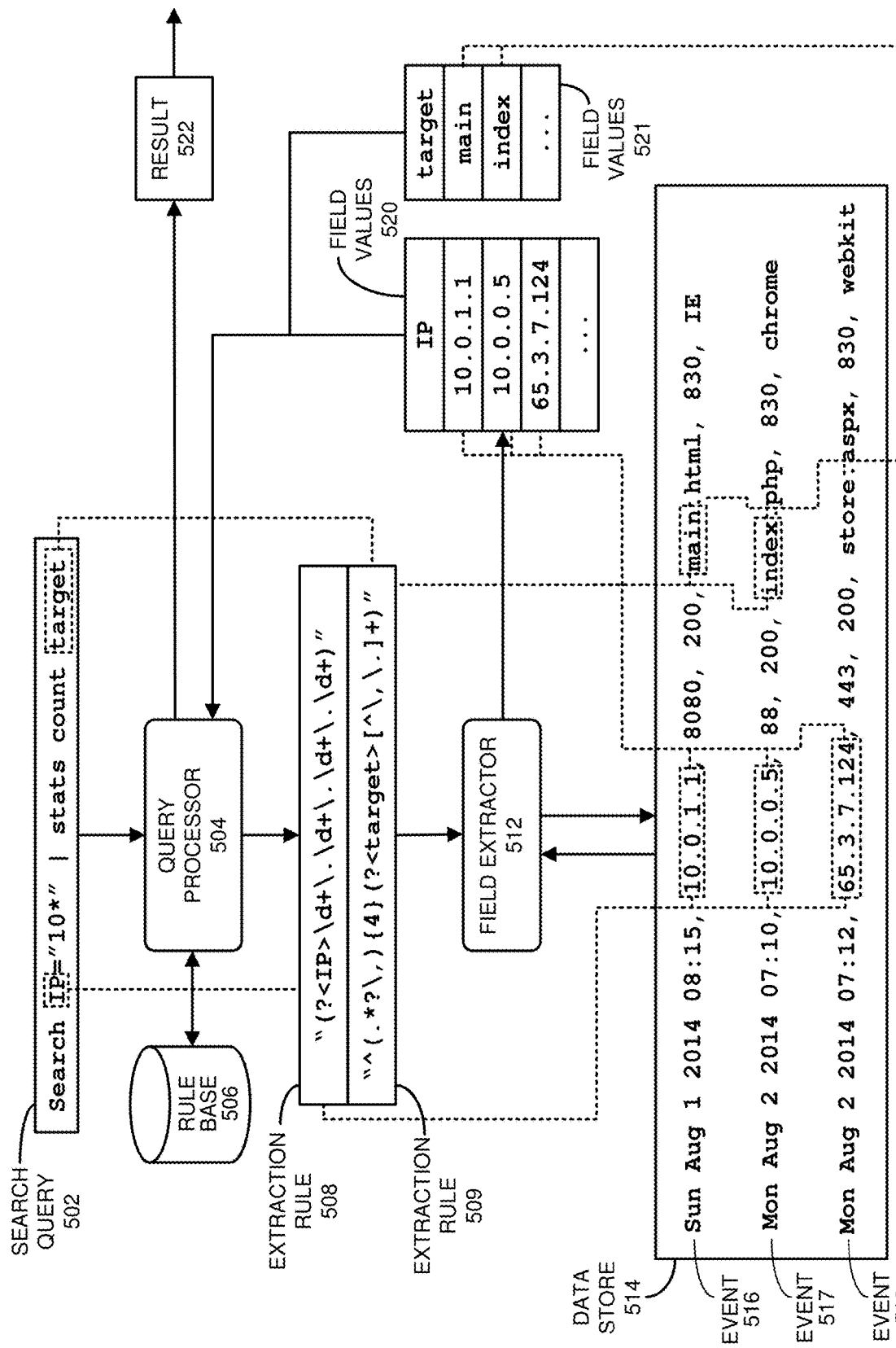
FIG. 5 illustrates a block diagram of a system for processing search requests that uses extraction rules for field values in accordance with the disclosed embodiments.

FIG. 5 illustrates an example of applying extraction rules to a search query received from a client. At the start of the process, a search query 502 is received at a query processor 504. Query processor 504 includes various mechanisms for processing a query and may reside in a search head 210 and/or an indexer 206. Note that the example search query 502 illustrated in FIG. 5 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 502 can also be expressed in other query languages, such as the Structured Query Language ("SQL") or any other query language.

In response to receiving search query 502, query processor 504 determines that search query 502 refers to two fields: "IP" and "target." Query processor 504 also determines that the values for the "IP" and "target" fields have not already been extracted from events stored in a data store 514, and consequently determines that query processor 504 can use extraction rules to extract values for the fields. Hence, query processor 504 performs a lookup for the extraction rules in a rule base 506. For example, rule base 506 may include a source type definition, where the source type definition includes extraction rules for various different source types. The query processor 504 obtains extraction rules 508-509, wherein extraction rule 508 specifies how to extract a value for the "IP" field from an event, and extraction rule 509 specifies how to extract a value for the "target" field from an event. As is illustrated in FIG. 5, extraction rules 508-509 can comprise regular expressions that specify how to extract values for the relevant fields. Such regular expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 504 sends extraction rules 508-509 to a field extractor 512, which applies extraction rules 508-509 to events 516-518 in a data store 514. Note that data store 514 can include one or more data stores, and extraction rules 508-509 can be applied to large numbers of events in data store 514, and are not meant to be limited to the three events 516-517 illustrated in FIG. 5. Moreover, the query processor 514 can instruct field extractor 512 to apply the extraction rules to all the events in a data store 514, or to a subset of the events that have been filtered based on some criteria.

Next, field extractor 512 applies extraction rule 508 for the first command "Search IP="10*"" to events in data store 514 including events 516-518. Extraction rule 508 is used to extract values for the IP address field from events in data store 514 by looking for a pattern of one or more digits, followed by a period, followed again by one or more digits, followed by another period, followed again by one or more digitals, followed by another period, and followed again by one or more digits. Next, field extractor 512 returns field values 520 to query processor 504, which uses the criterion IP="10*" to look for IP addresses that start with "10". Note that events 516 and 517 match this criterion, but event 518 does not, so the result set for the first command includes events 516-517.

Query processor 504 then sends events 516-517 to the next command "stats count target." To process this command, query processor 504 causes field extractor 512 to apply extraction rule 509 to events 516-517. Extraction rule 509 is used to extract values for the target field for events 516-517 by skipping the first four commas in events 516-517, and then extracting all of the following characters until a comma or period is reached. Next, field extractor 512 returns field values 521 to query processor 504, which executes the command "stats count target" to count the number of unique values contained in the target fields, which in this example produces the value "2" that is returned as a final result 522 for the query.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.9. Example Search Screen

Figure 7A:
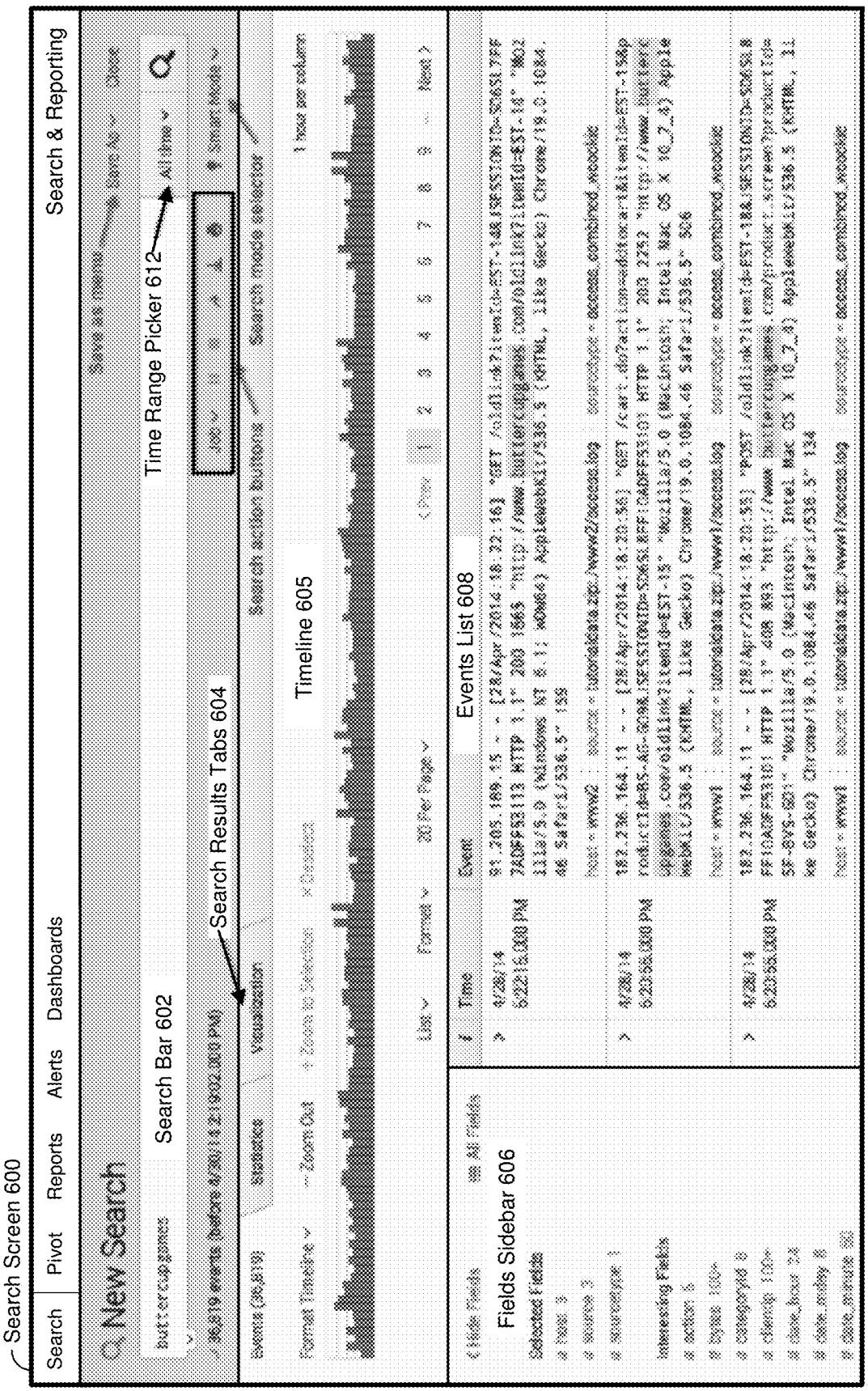
FIG. 7A illustrates a search screen in accordance with the disclosed embodiments.
Figure 7B:
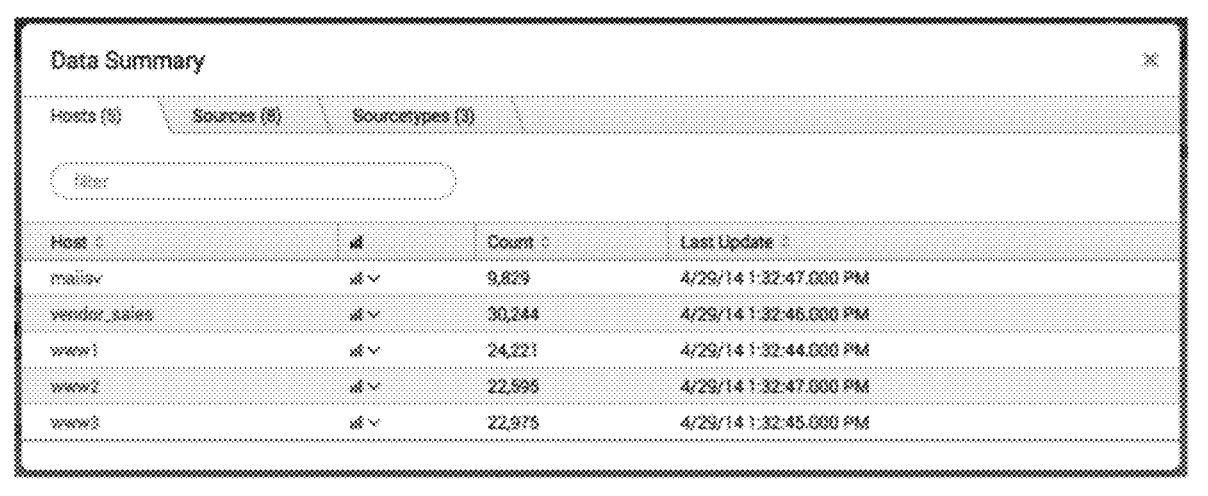

FIG. 7A illustrates an example search screen 700 in accordance with the disclosed embodiments. Search screen 700 includes a search bar 702 that accepts user input in the form of a search string. It also includes a time range picker 712 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 700 also initially displays a "data summary" dialog as is illustrated in FIG. 7B that enables the user to select different sources for the event data, for example by selecting specific hosts and log files.

After the search is executed, the search screen 700 can display the results through search results tabs 704, wherein search results tabs 704 includes: an "events tab" that displays various information about events returned by the search; a "statistics tab" that displays statistics about the search results; and a "visualization tab" that displays various visualizations of the search results. The events tab illustrated in FIG. 7A displays a timeline graph 705 that graphically illustrates the number of events that occurred in one-hour intervals over the selected time range. It also displays an events list 708 that enables a user to view the raw data in each of the returned events. It additionally displays a fields sidebar 706 that includes statistics about occurrences of specific fields in the returned events, including "selected fields" that are pre-selected by the user, and "interesting fields" that are automatically selected by the system based on pre-specified criteria.

2.10. Acceleration Technique

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

2.10.1. Map-Reduce Technique

Figure 6:
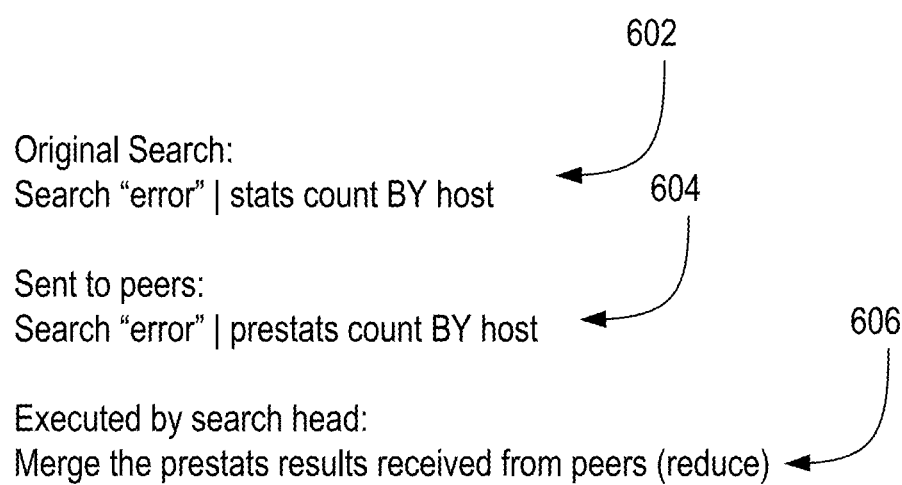
FIG. 6 illustrates an example search query received from a client and executed by search peers in accordance with the disclosed embodiments.

To facilitate faster query processing, a query can be structured as a map-reduce computation, wherein the "map" operations are delegated to the indexers, while the corresponding "reduce" operations are performed locally at the search head. For example, FIG. 6 illustrates how a search query 602 received from a client at a search head 210 can be split into two phases, including: (1) a "map phase" comprising subtasks 604 (e.g., data retrieval or simple filtering) that may be performed in parallel and are "mapped" to indexers 206 for execution, and (2) a "reduce phase" comprising a merging operation 606 to be executed by the search head when the results are ultimately collected from the indexers.

During operation, upon receiving search query 602, a search head 210 modifies search query 602 by substituting "stats" with "prestats" to produce search query 604, and then distributes search query 604 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 4, or may alternatively distribute a modified version (e.g., a more restricted version) of the search query to the search peers. In this example, the indexers are responsible for producing the results and sending them to the search head. After the indexers return the results to the search head, the search head performs the merging operations 606 on the results. Note that by executing the computation in this way, the system effectively distributes the computational operations while minimizing data transfers.

2.10.2. Keyword Index

As described above with reference to the flow charts in FIG. 3 and FIG. 4, data intake and query system 108 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on 19 Nov. 2013, and U.S. Pat. No. 8,412,696, issued on 2 Apr. 2011.

2.11. Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 8A:
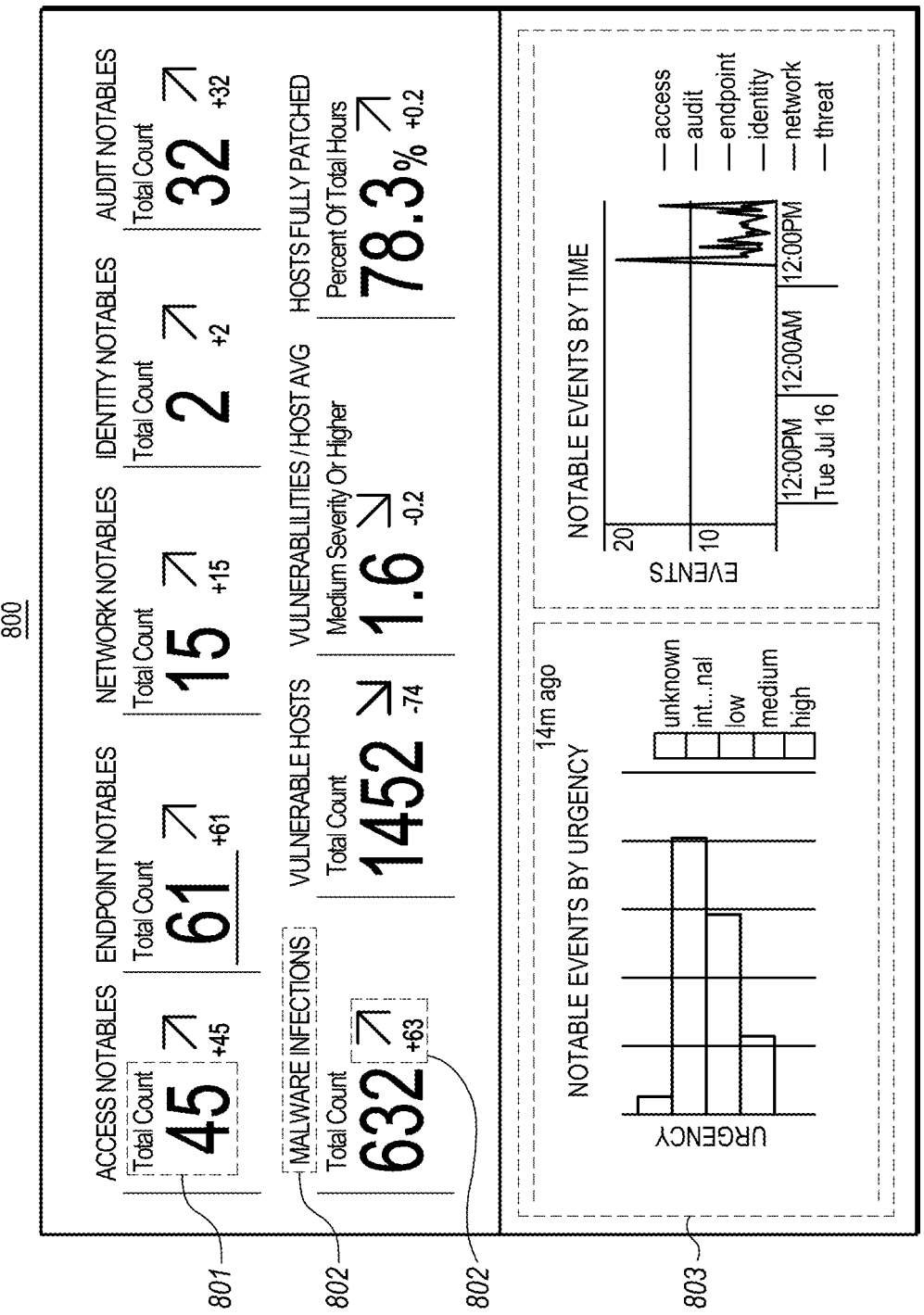
FIG. 8A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 8A illustrates an example key indicators view 800 that comprises a dashboard, which can display a value 801, for various security-related metrics, such as malware infections 802. It can also display a change in a metric value 803, which indicates that the number of malware infections increased by 63 during the preceding interval. Key indicators view 800 additionally displays a histogram panel 804 that displays a histogram of notable events organized by urgency values, and a histogram of notable events organized by time intervals. This key indicators view is described in further detail in pending U.S. patent application Ser. No. 13/956,338 filed Jul. 31, 2013.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 8B illustrates an example incident review dashboard 810 that includes a set of incident attribute fields 811 that, for example, enables a user to specify a time range field 812 for the displayed events. It also includes a timeline 813 that graphically illustrates the number of incidents that occurred in one-hour time intervals over the selected time range. It additionally displays an events list 814 that enables a user to view a list of all of the notable events that match the criteria in the incident attributes fields 811. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

2.12. Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167, 316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 8C:
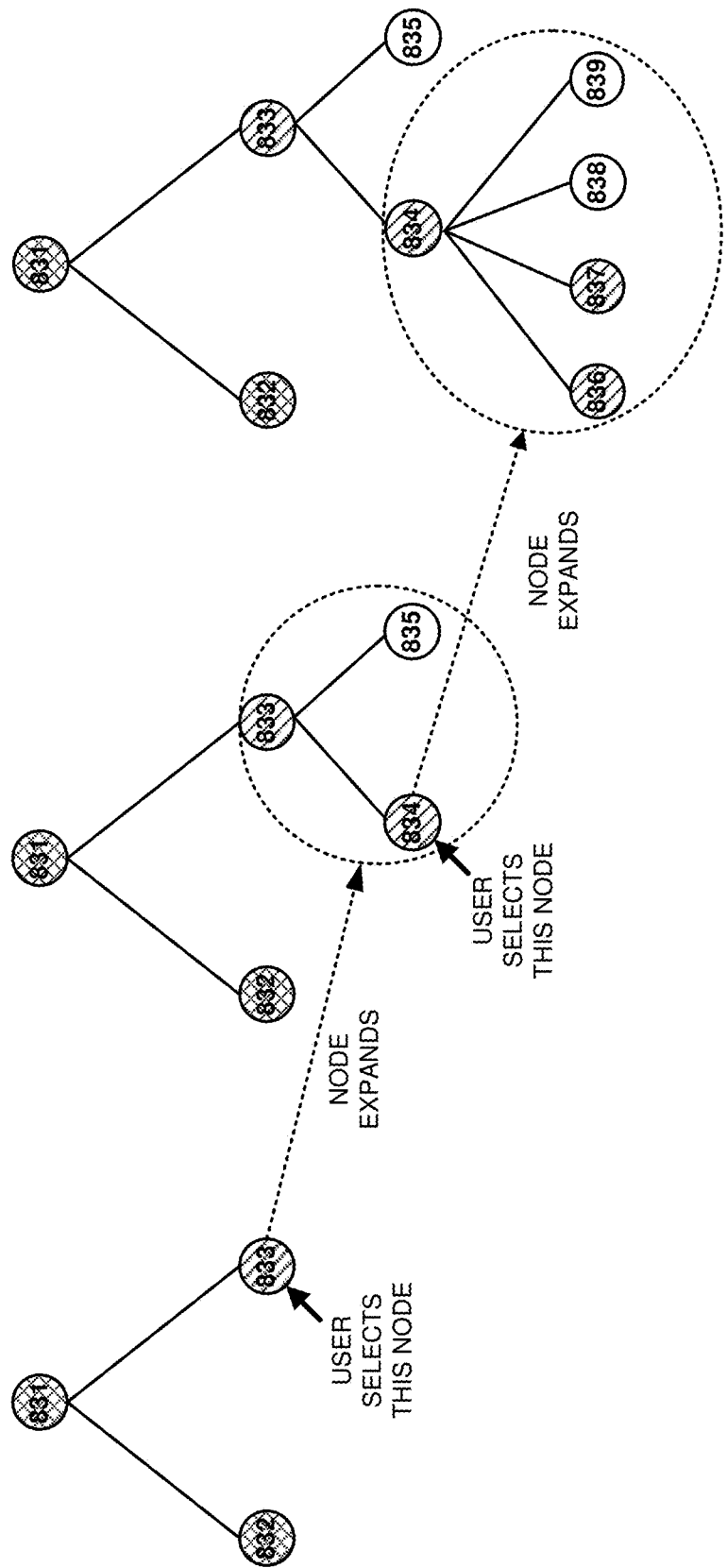
FIG. 8C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 8C, wherein nodes 833 and 834 are selectively expanded. Note that nodes 831-839 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 8D:
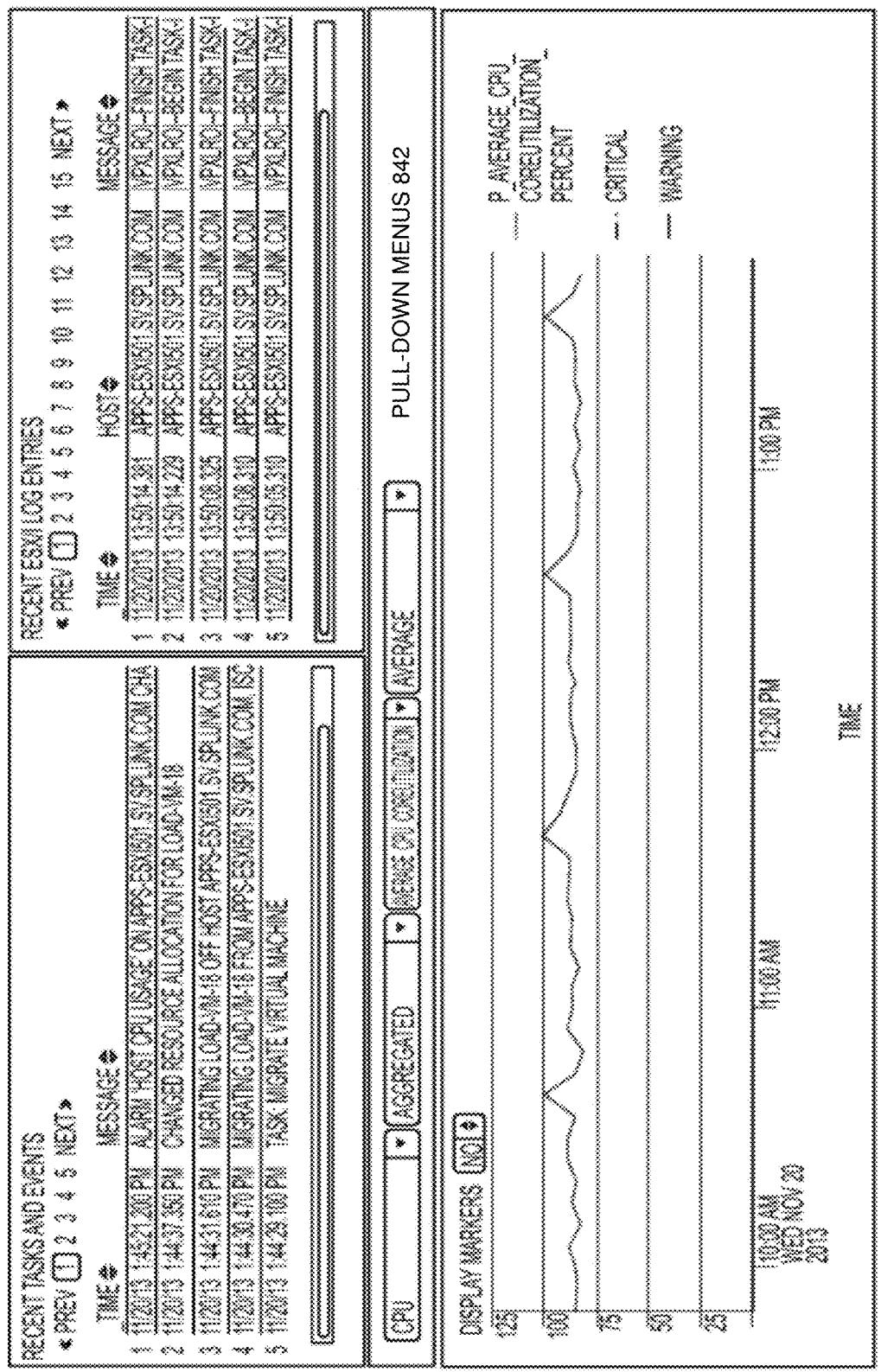
FIG. 8D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 8D displays a listing of recent "tasks and events" and a listing of recent "log entries" for a selected time range above a performance-metric graph for "average CPU core utilization" for the selected time range. Note that a user is able to operate pull-down menus 842 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution, meaning the system 108 is installed and operates on computing devices directly controlled by the user of the system. Some users may prefer an on-premises solution since it may provide a greater level of control over the configuration of certain aspects of the system. However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and providing access to the system to end users via a network. Typically, a user may pay a subscription or other fee to use such a service, and each subscribing user to the cloud-based service may be provided with an account that enables the user to configure a customized cloud-based system based on the user's preferences.

Figure 9:
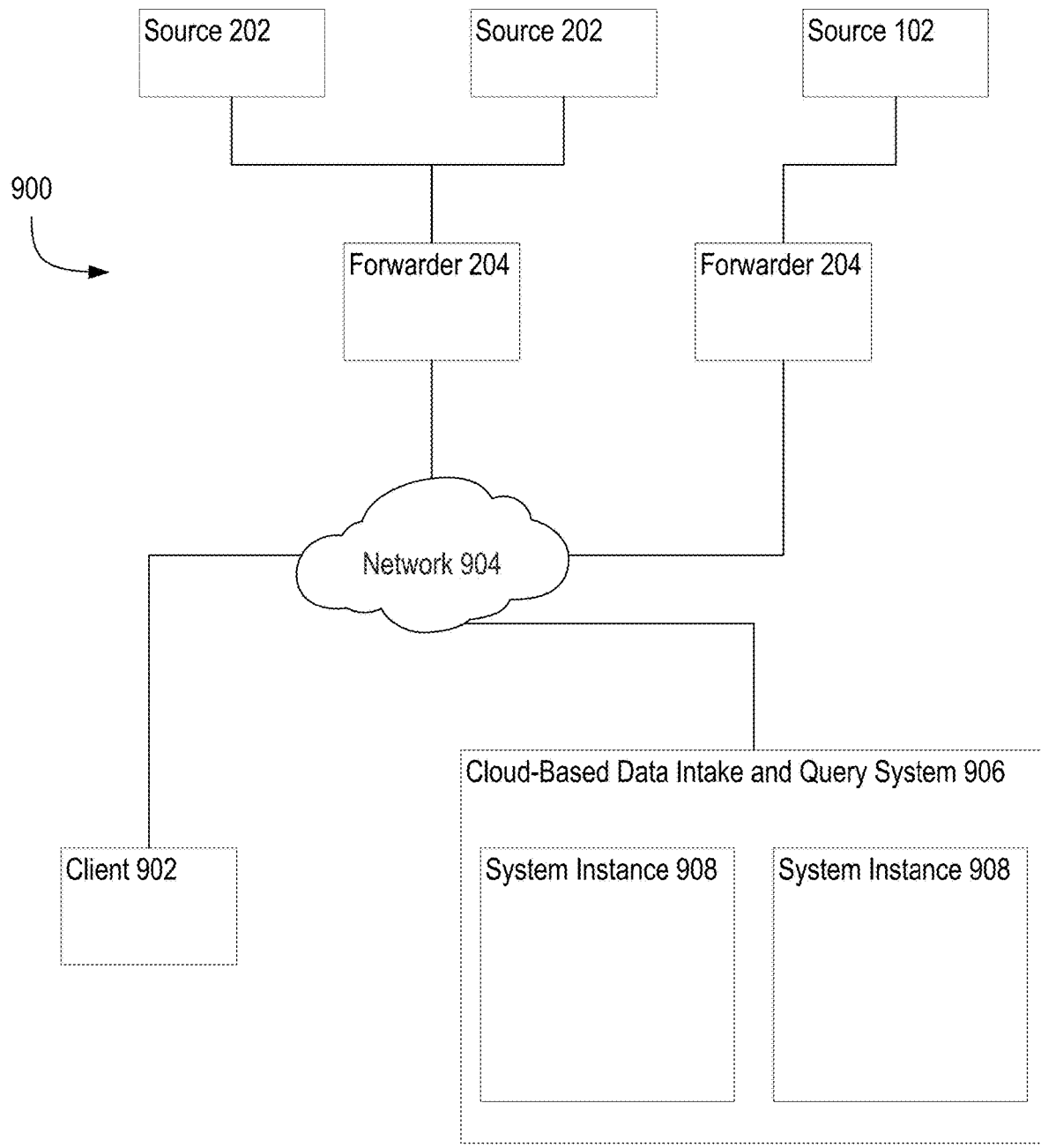
FIG. 9 illustrates a block diagram of an example cloud-based data intake and query system in which an embodiment may be implemented.

FIG. 9 illustrates a block diagram of an example cloud-based data intake and query system. Similar to the system of FIG. 2, the networked computer system 900 includes input data sources 202 and forwarders 204. In the example system 900 of FIG. 9, one or more forwarders 204 and client devices 902 are coupled to a cloud-based data intake and query system 906 via one or more networks 904. Network 904 broadly represents one or more LANs, WANs, cellular networks, and/or internetworks using any of wired, wireless, terrestrial microwave, satellite links, etc., and may include the public Internet, and is used by client devices 902 and forwarders 204 to access the system 906. Similar to the system of 108, each of the forwarders 204 may be configured to receive data from an input source and to forward the data to other components of the system 906 for further processing.

In an embodiment, a cloud-based data intake and query system 906 may comprise a plurality of system instances 908. In general, each system instance 908 may include one or more computing resources managed by a provider of the cloud-based system 906 made available to a particular subscriber. The computing resources comprising a system instance 908 may, for example, include one or more servers or other devices configured to implement one or more forwarders, indexers, search heads, and other components of a data intake and query system, similar to system 108. As indicated above, a subscriber may use a web browser or other application of a client device 902 to access a web portal or other interface that enables the subscriber to configure an instance 908.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 908). Thus may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof.

3.0. Functional Overview

The arrangement of FIG. 1 may implement a system that enables the correlation of performance data collected from a plurality of client devices and host devices to enable insight into performance issues and other information related to interactions among the devices. According to an embodiment, a data intake and query system 108 is configured to receive performance data from client devices 102 and separately from host devices 106 and to correlate portions of the data received using one or more identifiers contained in the data. The correlation of performance data from client devices 102 and host devices 106 may enable insights into the system-wide performance of network-based services that were previously unavailable based on analyzing performance data from client devices and host devices independently. Furthermore, the use of identifiers unique to each instance of a client application 110, to particular sessions of a client application 110, and/or to particular users of the client applications enables a highly granular view of network-based service performance across any number of client devices.

In various embodiments as further described herein, users of client devices 102 can use one or more client applications 110 to request resources or otherwise interact with one or more host applications 114 executing on host devices 106. For example, a client application 110 may be or comprise a mobile app developed by an operator of a particular network-based service and that is configured to provide access to a network-based service implemented by one or more host devices 106. For example, the network-based service may comprise one or more of a website, a social networking platform, an online marketplace, or virtually any other type of network-based service. A user may, for example, install the client application 110 on the user's client device 102 for use in accessing the service. Depending on a type of client device 102 and a current location of the user, the device may communicate with one or more host devices 106 via any number of different types of networks 104 including, for example, a wired network at the user's home, a public Wi-Fi network, or a cellular network.

As an example scenario where a network-based service administrator or other user may desire to correlate data from client devices and host devices, consider an administrator who receives a complaint from a user of a client device 102 indicating that the user is unable to connect to the service for a period of time, or that access to the service was excessively slow for the user. According to embodiments described herein, a data intake and query system 108 may receive over a period of time performance data generated by the user's client device 102 and separately receive performance data generated by one or more host devices 106 implementing the service, including performance data generated near in time to the point at which the user experienced the performance issues. The performance data received from both the client devices 102 and the host devices 106 may, for example, include one or more identifiers that identify the client device itself, an application instance executing on the device, and/or one or more sessions that occurred between the client device and host devices. Based on one or more of these identifiers, the data intake and query system 108 can correlate the collected performance data to identify particular portions of performance data related to both the particular client device and one or more host devices. The correlated performance data may, for example, include information indicating that during the time the user was experiencing issues, the user's local network was temporarily unavailable, that the client device was underperforming, or other information that enables an administrator to diagnose an issue that may have caused the user's poor experience. Furthermore, the administrator may use information about the device's operating state, such as a geographic location of the device or current network carrier, to investigate whether other similarly situated client devices were experiencing similar issues. Based on this information, an administrator of the network-based service may gain insights into the interaction between client devices and host devices that were previously not available for analysis, enabling better diagnosis of performance and other network-based service issues.

3.1. Collecting Client Device Performance Data

Figure 10:
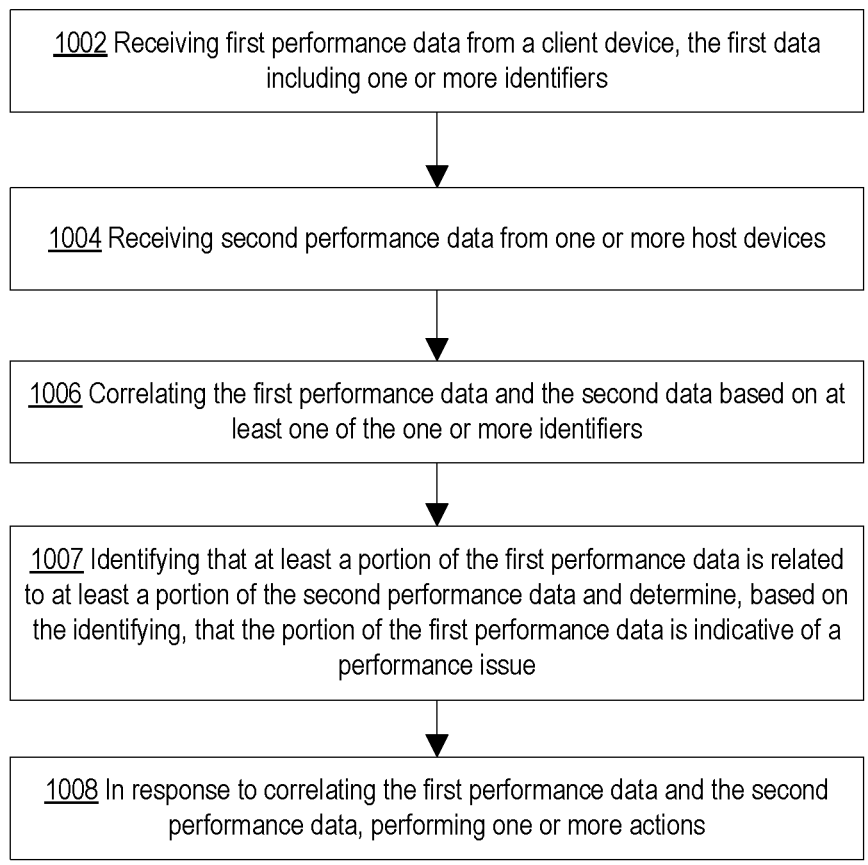
FIG. 10 is a flow diagram that illustrates an example process for collecting performance data from client devices and host devices and correlating the collected data for presentation, according to an embodiment of the invention.

FIG. 10 is a flow diagram illustrating an example process for collecting performance data from both client devices and host devices and correlating the data based on one or more identifiers. At block 1002, a data intake and query system receives performance data from a client device, the performance data including one or more identifiers. For example, a monitoring component 112 of a client application 110 may send the performance data to a forwarder 204 of a data intake and query system 108 via one or more networks 104.

A monitoring component 112 may be invoked and caused to send performance data to a data intake and query system 108 based on any number of application events. In one embodiment, a monitoring component 112 may be invoked upon launching the client application 110. The client application 110 may be launched, for example, upon user selection of the client application 110 via an interface of the client device 102 remotely launched (e.g., via a remote computer) by a developer or an administrator to cause monitoring, automatically launched when the client device 102 is activated, or in any other manner.

At some point during execution of the client application 110, monitoring functionality of a monitoring component 112 may be triggered or initiated. As one example, monitor trigger code (e.g., one or more lines of code) may be included at various points in the code of client application 110 code that initiates or triggers the monitoring component 112 to collect performance data or perform other operations. The points in the code of the client application at which the monitor trigger code is placed may be determined by a developer of the client application 110 to correspond to points of possible interest for monitoring, for example, when user input is received, when the client application 110 sends or receives one or more network messages, or in relation to any other application events of interest.

In an embodiment, the monitoring component 112 of a client application 110 may listen for or detect particular application events or functionality that causes or initiates collection of performance data. As one example, the monitoring component 112 may listen for a network connection event, such as initiation of an HTTP connection with a host device 106. An HTTP connection/session is a sequence of network request-response transactions. For instance, the client application 110 may initiate a request by establishing a Transmission Control Protocol (TCP) connection or other type of connection to a particular port on a server hosted by a host device 106. As another example, the monitoring component 112 may initiate collection of performance data in response to detecting that client device 102 has successfully connected to a network 104, or performance data may be collected on a periodic basis without any specific trigger, or based on detecting any other type of events or monitoring rules.

In an embodiment, a monitoring component 112 may be configured to collect a wide variety of performance data items related to the operation of the client device 102 and/or a client application 110. For example, a monitoring component 112 may collect information related to performance of a network 104 to which a client device 102 is connected. A monitoring component 112 may collect profile information related to the client device 102, for example, identifying software installed on the device, a manufacturer and model of the device, etc. A monitoring component 112 may also collect information about the current operating state of the client device 102 and/or a client application 110 such as, for example, memory performance information, a current wireless signal reception level, a URL or other identifier of a resource requested by the device, a spatial orientation of the device, and a geographic location of the device (e.g., collected based on device GPS information, IP address information, or other location data).

In one embodiment, a monitoring component 112 may generate performance data comprising one or more data records that record performance data information associated with particular points in time and/or in relation to one or more particular events that triggered collection of the performance data. Each performance data record may, for example, include one or more field-value pairs that store various performance data items. For example, one data field may be associated with a value indicating a particular network performance measurement, another data field may be associated with a value indicating a type or version of operating system that is installed on the device, etc.

In an embodiment, each performance data record generated by a monitoring component 112 may further include one or more fields that store identifier values related to the associated client application 110, client device 102, and/or a user associated with the client device. An application instance identifier, for example, may identify a particular instance of a client application 110. In an embodiment, each application instance identifier may be unique to a particular installation of a client application 110 across any number of client devices 102. For example, if a particular mobile app is installed on two or more separate client devices, a monitoring component associated with each respective installation instance of the application may be configured to generate a unique application instance identifier for each instance. Similarly, if two or more different client applications 110 are installed on the same client device 102, a monitoring component 112 associated with each of the two or more different client applications 110 may be configured to generate a unique application instance identifier for each of the two or more different client applications.

A session identifier may, for example, identify a particular session of a client application 110. In this context, a session generally may refer to some span of time or activities related to a client application 110, possibly with respect to one or more host devices 106. As one example, each session of a client application 110 may correspond to a period of time between when a user starts the client application and when the application exits. In this example, a monitoring component 112 may be configured to generate a different session identifier each time the client application is opened and exits. As another example, a monitoring component 112 may be configured to generate a different session identifier each time a client application 110 establishes a connection with a particular network 104 or with a particular host application 114. As yet another example, a monitoring component 112 may be configured to generate a different session identifier based on the passage of some increment of time (e.g., every minute, every hour, etc.). A session identifier generally may be any value, and may include time information indicating when the session started and/or ended. In an embodiment, one or more rules for generating session identifiers may be configurable by a developer of client application 110 depending on the application and may vary from client application to client application.

In an embodiment, a user identifier generally may be any identifier of a user of a client application 110. The user identifier may, for example, be randomly generated for each user, or based on a username or email address supplied by the user to a client application 110. Thus, a monitoring component 112 of a client application 110 may store a different user identifier in association with performance data depending on a particular user using the application at a particular time, for example, based on login credentials supplied by the user.

As indicated above, a monitoring component 112 of a client application 110 generally may be configured to send performance data generated by the component to a data intake and query system 108 via one or more networks 104. In an embodiment, a client application 110 may also be configured to include one or more of the identifiers included in the performance data (e.g., an application instance identifier, a session identifier, and a user identifier) in one or more data packets sent to host devices 106. For example, a client application 110 may be configured to store the identifiers in one or more packet headers of data packets sent from the client application 110 to host devices 106. If the data packets comprise one or more HTTP requests, for example, the identifiers may be included in one or more HTTP request headers. As described in more detail hereinafter, the inclusion of the identifiers in the data packet headers may enable host devices 106 to generate and store host performance data in association with the same identifiers.

It is noted that a client device 102 initially may be unable to send the performance data to the system 108 due to the unavailability of one or more networks 104 to which the device is connected, or other issues related to a network 104 or the client device. These issues may, for example, also affect the ability of the client device 102 to communicate with one or more host devices 106. For example, a user may be using a mobile device that is currently unable to connect to any wireless connections in range of the device. In an embodiment, if a client device 102 is unable to send generated performance data to a data intake and query system 108 due to issues with a network 104 or with the client device 102, a client application 110 may store the generated performance data "offline" in local storage of the client device and send the performance data at a later time when a connection to the system 108 is available. In this manner, performance data generated by a particular client device 102 may be received by a data intake and query system 108 for analysis even if the client device is unable to send the data at the time it is generated. Because the performance information is generated during a time when the client device is experiencing network connectivity or other issues, information included in the performance data may, for example, be of value in diagnosing a cause or causes of the issues.

3.2. Collecting Host Device Performance Data

At block 1004, performance data is received from one or more host devices. For example, one or more host devices 106 may generate a variety of performance data during operation that is sent to a data intake and query system 108 for analysis. A host device 106 may, for example, send the performance data to a forwarder 204 or other component of the data intake and query system 108 for processing, or a host device 106 may comprise a forwarder that sends the data to system 108.

In an embodiment, the performance data generated by host devices 106 can include, among other types of data, data from one or more log files, network packet data, and other data generated by one or more host applications 114 hosted or executing on one or more host devices 106. For example, if a host device 106 comprises a web server, the performance data may include one or more web server log files or other diagnostic information generated by the web server during operation, one or more log files generated by an operating system executing on the host device, and/or performance data related to one or more networks 104 to which the host device 106 is connected.

In an embodiment, performance data generated by host devices 106 may be associated with one or more identifiers, some or all of which may correspond to the identifiers generated by client devices 102, as described in reference to block 1002. As indicated above, a client application 110 may send one or more network messages to a host device 106 and include one or more the identifiers in packet headers or other portions of the network messages. A host application 114 receiving the requests may be configured to extract some or all of the information stored in the headers, including the one or more identifiers, and store the identifiers in association with performance data generated by the host application. A host device 106 comprising a web server, for example, may receive one or more requests including identifiers stored in one or more headers, extract the identifiers from the headers, and store the identifiers in one or more log files in association with other performance data related to the processing of the requests.

In an embodiment, a system 108 may receive performance data from a plurality of host devices 106 that are involved in processing network messages from client devices 102 and which may collectively implement a particular network-based service. For example, if a client device 102 sends a request to view a particular webpage to a host device 106 comprising a web server, the web server may generate additional requests to one or more application servers, database servers, or other host devices 106 and/or host applications 114 to satisfy the request. In an embodiment, each of these additional requests may include one or more of the identifiers included in the original request from the client device to the web server. For example, a web server may receive a request from a client device and store client device identifiers extracted from one or more packet headers in association with web server performance data. The web server may also send a request to a database server and include the client device identifiers in the database request, and the database server may store the client device identifiers in association with database server performance data. By persisting the identifiers across a plurality of host applications 114 involved in processing a request from a client device, a data intake and query system 108 may correlate performance data not only between a single client device and a single host device, but instead across any number of client devices and host devices involved in any particular interaction or set of interactions.

3.3. Correlating Performance Data

According to embodiments described herein, a data intake and query system 108 may enable correlation of performance data collected from any number of client devices 102 and host devices 106. In response to receiving performance data from client devices and host devices, a system 108 may perform various operations to parse, transform, and store the data in one or more indexes as a collection of events. For example, a data intake and query system 108 may store performance data received from client devices 102 and host devices 106 in at least two separate indexes: one containing data received from client devices 102, and another containing data received from host devices 106. In other examples, indexed data generated from both client device and host device performance data may be stored in the same index.

While each of the client device and host device performance data stored in such indexes may be of interest on their own, even greater insight into the interaction between client devices and host devices may be obtained if particular data items from the two data sets are correlated. For example, if a user of a client device 102 is unable to access or experiences poor performance from a network-based service implemented by one or more host devices 106, an administrator of the network-based service may use the system to search for data records that pertain to the interaction in question from both data sets. In response to such a query, a data intake and query system may generate one or more reports or other displays that present the correlated data such that both client device and host device performance data can be analyzed together. Based on such displays, the administrator of the network-based service may be better able to determine whether the issue originated with the client device, a network situated between the client device and host devices, or with the host devices implementing the network-based service.

Referring again to FIG. 10, at block 1006, a data intake and query system correlates performance data received from one or more client devices and one or more host devices. In this context, correlating performance data generally may refer to identifying, at block 1007, one or more portions of the performance data received from client devices 102 and one or more portions of the performance data received from host devices 106 that are related. The portions of data may be related, for example, because they each pertain to the same client device 102, client application 110, host device 106, host application 114, and/or to one or more particular interactions between one or more client devices 102 and one or more host devices 106. For example, a user of system 108 may submit a search query for information related to a particular instance of a client application 110, and system 108 may correlate and return performance data related to the particular application instance and to one or more host devices 106 with which the particular application instance of the client application 110 has communicated.

In one embodiment, a data intake and query system 108 may correlate performance data received from client devices 102 and host devices 106 based on one or more IP addresses included in the performance data. For example, in performance data records generated by a client application 110, the application may record an IP address associated with the device. Similarly, a host device 106 receiving a request from the client device may store the client device's IP address in association with host device performance data. In this example, performance data from each data set may be correlated with the other based on locating events in each data set that contain the same IP address. However, correlation of performance data based on IP addresses may not provide a desired level of granularity since many network providers may pool any number of separate client devices 102 into a smaller set of originating IP addresses. As a result, a plurality of client devices 102 connected to a particular network 104 in the same general area may not be distinguishable from one another based on an originating IP address alone.

In one embodiment, to provide a greater level of precision in identifying individual client devices 102 and/or client application 110 instances, client device and host device performance data may be correlated based on one or more identifiers stored in the performance data, including one or more of an application instance identifier, a session identifier, and a user identifier. As described above, client application 110 may store each of these identifiers in performance data generated by the application, and also in one or more network messages sent to host applications 114. A host application 114 receiving the network messages can extract and store the identifiers in performance data generated by the host application. A system 108 receiving the performance data generated by the client applications 110 and host applications 114 may then create and store event records that include the one or more identifiers. Because the identifiers are included in event records created from both the client performance data and host performance data, the data can be correlated by retrieving event records that contain one or more matching identifiers.

Thus, for example, if an administrator of a network-based service desires to analyze performance data for a particular user, client device, and/or client application instance, the administrator may submit a search query to system 108 that specifies one or more identifiers of the subject of interest. In response to the query, the system 108 may search one or more indexes, comprising both client device and host device performance data, to locate portions of the performance data in the one or more indexes that include the specified identifiers.

In one embodiment, client performance data and host performance data may be correlated based on at least an application instance identifier and a session identifier. For example, an application instance identifier may identify a particular instance of a client application 110 hosted by a client device 102; a session identifier may identify a particular session (e.g., a collection of one or more network calls) between the client device 102 and one or more host devices 106. By correlating based on both an application instance identifier and a session identifier, a high level of precision may be obtained relative to individual client devices and particular interactions of those client devices with one or more host devices. In other examples, client performance data and host performance data may be correlated based on fewer identifiers (e.g., only an application instance identifier, or only a session identifier), to obtain a broader but potentially less precise set of correlated performance information. In other examples, even more identifiers may be used (e.g., a user identifier, device identifier, etc.) in order to identify particular client devices 102 and/or client device interactions with possibly even greater precision.

In one embodiment, performance data for a particular client application 110 may be correlated with performance data from a plurality of host applications 114. As described above, a client application 110 may send a request to a network-based service initially received by a host application 114 comprising a web server, which may in turn send one or more requests to separate host applications 114 including a database server, an application server, and any other applications involved in processing the request. Each of these separate host applications 114 may generate separate performance data that is sent to data intake and query system 108, and which may be returned in response to a search for correlated data.

In an embodiment, performance data may also be correlated across a plurality of client devices 102 or host devices 106. For example, it may be determined that a particular client device 102 operating at a particular geographic location, or connected to a particular network 104 is experiencing issues when communicating with a particular network-based service. In response to this determination, a user may submit a query to system 108 to correlate performance data for the particular client device 102 with other client devices that are located in or near the same geographic location (e.g., based on collected GPS information, IP address information, etc.), or connect using the same network 104. In response to the query, the system 108 may return performance data for all client devices satisfying the query. The performance data may indicate, for example, that multiple client devices in a particular geographic area, or connecting to a particular network 104, are experiencing similar latency or other connectivity issues.

3.4. Presenting Correlated Performance Data

In response to determining that at least a portion of client device performance data is related to at least a portion of host device performance data, at block 1008, one or more components of the data intake and query system 108 may perform one or more actions. In general, the one or more actions may include generating one or more displays, generating alerts, or any other actions that may be performed by one or more system components.

In one embodiment, a system 108 may generate one or more displays which present portions of the performance data received from client devices 102 and/or host devices 106. For example, the displays may include one or more graphical interfaces that display events derived from the performance data collected by the system 108, each event corresponding to a client application 110 and/or host application 114 relevant to a user query. For example, a user may submit a query for information related to the operation of a particular client application 110 during a particular time (e.g., to diagnose a performance issue that occurred during that time). In response, the system 108 may generate a display that includes one or more events derived from performance data received from the particular client application 110 and related to the specified period of time, in addition to correlated events derived from performance data received from host applications 114 with which the particular client application 110 interacted during the specified time.

Each displayed event may, for example, include various performance data items related to a client application 110 and/or host application 114 such as, for example, network latency information, connection type information, the geographic location of a client device, etc. The information displayed may, for example, provide performance information about one or more interactions that occurred between one or more client devices 102 and one or more host devices 106 during the specified time, enabling a user to review and diagnose the cause of the identified performance issues.

In one embodiment, the displays generated by system 108 may include one or more browser-based interfaces. For example, a user may use a web browser to access various components of the system 108, including one or more search interfaces. Using a search interface, the user may, for example, specify a query related to one or more client applications 110 and/or host applications 114 of interest. In response, a component of system 108 may perform a search for events responsive to the user's query, as described above, and generate a browser-based interface including search results which may be displayed at the user's device.

In an embodiment, the one or more actions may include generating one or more alerts. For example, if based on the correlated data, a component of the system determines that a possible performance issue exists, the component may generate one or more alerts to an administrator or other issue that notify the user of the possible issue.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

4.0. Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 12 is a block diagram that illustrates a computer system 1200 upon which an embodiment may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

5.0. Example Embodiments

In an embodiment, a method or non-transitory computer readable medium comprises: receiving, from a client device, first performance data generated by a first application executing on the client device, the first performance data including at least an application instance identifier, a session identifier, and information related to the operation of the client device during a time when the first application encountered an application event related to network communications with a host device; receiving, from the host device, second performance data generated by a second application executing on the host device, the second performance data including the application instance identifier, the session identifier, and information related to the operation of the host device during the time when the first application encountered the application event related to network communications with the host device; determining, based on at least the application instance identifier and the session identifier, that at least a portion of the first performance data is related to at least a portion of the second performance data; in response to determining that at least a portion of the first performance data is related to at least a portion of the second performance data, performing an action.

In an embodiment, the method or computer readable medium further comprises: wherein the application event is associated with one or more network errors or performance issues experienced by the client device.

In an embodiment, the method or non-transitory computer readable medium further comprises: wherein the application event is associated with one or more network errors or performance issues experienced by the host device.

In an embodiment, the method or non-transitory computer readable medium further comprises: wherein the application event is associated with one or more network errors or performance issues associated with one or more networks connecting the client device and the host device.

In an embodiment, the method or non-transitory computer readable medium further comprises: wherein the first performance data includes information related to the operation of the client device during a time when the first application encountered one or more application events related to network communications with two or more host devices, the one or more application events associated with one or more network errors or performance issues.

In an embodiment, the method or non-transitory computer readable medium further comprises: wherein the first performance data includes information related to the operation of two or more client devices, wherein each of the two or more client devices encountered at least one application event associated with a network error or performance issue related to network communications with the host device.

In an embodiment, the method or non-transitory computer readable medium further comprises: wherein the application event is associated with a network error or performance issue, and wherein the first application stores the first performance data offline for a period of time prior to sending the first performance data to a data intake and query system.

In an embodiment, the method or non-transitory computer readable medium further comprises: wherein the second performance data includes data generated by a plurality of second applications executing on a plurality of host devices.

In an embodiment, a method or non-transitory computer readable medium comprises: wherein the client device stores the application instance identifier and session identifier in one or more packet headers of a request sent to the host device.

In an embodiment, a method or non-transitory computer readable medium comprises: wherein the application event is associated with one or more network errors or performance issues associated with the client device, and wherein the first performance data includes network performance information related to a network to which the client device was connected during the time when the first application encountered the application event related to network communications with the host device.

In an embodiment, a method or non-transitory computer readable medium comprises: wherein the application event is associated with one or more network errors or performance issues associated with the client device, and wherein the first performance data includes information related to a geographic location of the client device during the time when the first application encountered the application event.

In an embodiment, a method or non-transitory computer readable medium comprises: wherein the first performance data includes information identifying one or more of: a manufacturer and model of the client device, one or more software applications installed on the client device, and a network carrier.

In an embodiment, a method or non-transitory computer readable medium comprises: wherein the first application is a mobile application and wherein the second application is one or more of: a web server, an application server, and a database server.

In an embodiment, a method or non-transitory computer readable medium comprises: wherein determining that at least a portion of the first performance data is related to at least a portion of the second performance data includes determining that the application instance identifier of the first performance data matches the application instance identifier of the second performance data, and determining that the session identifier of the first performance data matches the session identifier of the second performance data.

In an embodiment, a method or non-transitory computer readable medium comprises: wherein performing the action includes causing display of a report that includes information from both the first performance data and the second performance data, the information including a plurality of events derived from the first performance data and the second performance data.

In an embodiment, a method or non-transitory computer readable medium comprises: wherein the application event is associated with one or more network errors or performance issues, and wherein performing the action comprises generating an alert indicating the one or more network errors or performance issues.

In an embodiment, a method or non-transitory computer readable medium comprises: wherein the first performance data includes information related to a geographic location of the client device during the time when the first application encountered the application event related to network communications with the host device, the geographic location determined based on Global Positioning System (GPS) data or an IP address obtained from the client device.

In an embodiment, a method or non-transitory computer readable medium comprises: wherein the first performance data includes data received from a plurality of client devices that each encountered at least one application event associated with a network error or performance issue related to network communications with the host device; determining, based on a geographic location determined for each client device of the plurality of client devices, that the network error or performance issue is associated with a geographic area containing each of the plurality of client devices.

In an embodiment, a method or non-transitory computer readable medium comprises: wherein performing the action comprises causing display of a report that includes information from both the first performance data and the second performance data.

In an embodiment, a method or non-transitory computer readable medium comprises: wherein performing the action comprises generating an alert.

In an embodiment, a method or non-transitory computer readable medium comprises: wherein the network error or performance issue is related to a network connectivity issue, and wherein the first application stores the first performance data offline, and wherein the first application sends the first performance data the next time it regains network connectivity.

In an embodiment, a method or non-transitory computer readable medium comprises: wherein the second performance data includes performance data related to a request sent by a first host device to a second host device.

In an embodiment, a method or non-transitory computer readable medium comprises: wherein the first performance data includes information related to a geographic location of the client device during the time when the first application experienced the network error or performance issue, the information related to a geographic location derived from Global Positioning System (GPS) data obtained from the client device.

6.0. Extensions And Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

In drawings, various system components are depicted as being communicatively coupled to various other components by arrows. These arrows illustrate only certain examples of information flows between the components of the depicted systems. Neither the direction of the arrows nor the lack of arrow lines between certain components should be interpreted as indicating the absence of communication between the certain components. Indeed, each component of the depicted systems may feature an open port, API, or other suitable communication interface by which the component may become communicatively coupled to other components of the depicted systems as needed to accomplish any of the functions of the systems described herein.

What is claimed is:

1. A method, comprising:
   receiving, by a data intake and query system coupled to a computer network, first performance data generated by a first application executing on a client device on the computer network, the first performance data including at least an application instance identifier, a session identifier, and information related to operation of the client device during a time when the first application encountered an application event related to network communications over the computer network with a host device, the host device being coupled to the computer network;
   receiving, by the data intake and query system from the host device, second performance data generated by a second application executing on the host device, the second performance data including the application instance identifier, the session identifier, and information related to the operation of the host device during the time when the first application encountered the application event related to network communications with the host device;
   identifying, by the data intake and query system, based on at least the application instance identifier and the session identifier, that at least a portion of the first performance data is related to at least a portion of the second performance data;
   determining, based on the identifying of the portion of the first performance data as being related to the portion of the second performance data, that the portion of the first performance data is indicative of a performance issue of the computer network; and
   in response to determining that at least the portion of the first performance data is indicative of the performance issue of the computer network, generating a display that includes:
      a first event that is derived from the first performance data and that corresponds to the time when the first application encountered the application event, and
      a second event that is derived from the second performance data and that corresponds to the time when the first application encountered the application event.

2. The method of claim 1, wherein the application event is associated with one or more network errors or performance issues experienced by the client device.

3. The method of claim 1, wherein the application event is associated with one or more network errors or performance issues experienced by the host device.

4. The method of claim 1, wherein the application event is associated with one or more network errors or performance issues associated with one or more networks connecting the client device and the host device.

5. The method of claim 1, wherein the first performance data includes information related to the operation of the client device during a time when the first application encountered one or more application events related to network communications with two or more host devices, the one or more application events associated with one or more network errors or performance issues.

6. The method of claim 1, wherein the first performance data includes information related to operation of two or more client devices that each encountered at least one application event associated with a network error or performance issue related to network communications with the host device.

7. The method of claim 1, wherein the application event is associated with a network error or performance issue, and wherein the first application causes the first performance data to be stored offline for a period of time prior to sending the first performance data to a data intake and query system.

8. The method of claim 1, wherein the second performance data includes data generated by a plurality of second applications executing on a plurality of host devices.

9. The method of claim 1, wherein the client device causes the application instance identifier and session identifier to be stored in one or more packet headers of a request sent to the host device.

10. The method of claim 1, wherein the application event is associated with one or more network errors or performance issues associated with the client device, and wherein the first performance data includes network performance information related to a network to which the client device was connected during the time when the first application encountered the application event related to network communications with the host device.

11. The method of claim 1, wherein the application event is associated with one or more network errors or performance issues associated with the client device, and wherein the first performance data includes information related to a geographic location of the client device during the time when the first application encountered the application event.

12. The method of claim 1, wherein the first performance data includes information identifying one or more of: a manufacturer and model of the client device, one or more software applications installed on the client device, and a network carrier.

13. The method of claim 1, wherein the first application is a mobile application and wherein the second application is one or more of: a web server, an application server, and a database server.

14. The method of claim 1, wherein determining that at least a portion of the first performance data is related to at least a portion of the second performance data includes determining that the application instance identifier of the first performance data matches the application instance identifier of the second performance data, and determining that the session identifier of the first performance data matches the session identifier of the second performance data.

15. The method of claim 1, wherein the application event is associated with one or more network errors or performance issues, and wherein the method further comprises generating an alert indicating the one or more network errors or performance issues.

16. The method of claim 1, wherein the first performance data includes information related to a geographic location of the client device during the time when the first application encountered the application event related to network communications with the host device, the geographic location determined based on Global Positioning System (GPS) data or an IP address obtained from the client device.

17. The method of claim 1, further comprising:
wherein the first performance data includes data received from a plurality of client devices that each encountered at least one application event associated with a network error or performance issue related to network communications with the host device; and
determining, based on a geographic location determined for each client device of the plurality of client devices, that the network error or performance issue is associated with a geographic area containing each of the plurality of client devices.

18. One or more non-transitory storage media storing instructions, execution of which by one or more computing devices causes:
receiving, from a client device coupled to a computer network, first performance data generated by a first application executing on the client device, the first performance data including at least an application instance identifier, a session identifier, and information related to operation of the client device during a time when the first application encountered an application event related to network communications over the computer network with a host device, the host device being coupled to the computer network;
receiving, from the host device, second performance data generated by a second application executing on the host device, the second performance data including the application instance identifier, the session identifier, and information related to the operation of the host device during the time when the first application encountered the application event related to network communications with the host device;
identifying, based on at least the application instance identifier and the session identifier, that at least a portion of the first performance data is related to at least a portion of the second performance data;
determining, based on the identifying of the portion of the first performance data as being related to the portion of the second performance data, that the portion of the first performance data is indicative of a performance issue of the computer network; and
in response to determining that at least the portion of the first performance data is indicative of the performance issue of the computer network, generating a display that includes:
a first event that is derived from the first performance data and that corresponds to the time when the first application encountered the application event, and
a second event that is derived from the second performance data and that corresponds to the time when the first application encountered the application event.

19. The one or more non-transitory storage media of claim 18, wherein the application event is associated with one or more network errors or performance issues experienced by the client device.

20. The one or more non-transitory storage media of claim 18, wherein the application event is associated with a network error or performance issue, and wherein the first application causes storage of the first performance data offline for a period of time prior to sending the first performance data to a data intake and query system.

21. The one or more non-transitory storage media of claim 18, wherein the client device causes storage of the application instance identifier and session identifier in one or more packet headers of a request sent to the host device.

22. The one or more non-transitory storage media of claim 18, wherein the application event is associated with one or more network errors or performance issues associated with the client device, and wherein the first performance data includes network performance information related to a network to which the client device was connected during the time when the first application encountered the application event related to network communications with the host device.

23. The one or more non-transitory storage media of claim 18, wherein the application event is associated with one or more network errors or performance issues associated with the client device, and wherein the first performance data includes information related to a geographic location of the client device during the time when the first application encountered the application event.

24. The one or more non-transitory storage media of claim 18, wherein the first performance data includes information identifying one or more of: a manufacturer and model of the client device, one or more software applications installed on the client device, and a network carrier.

25. The one or more non-transitory storage media of claim 18, wherein determining that at least a portion of the first performance data is related to at least a portion of the second performance data includes determining that the application instance identifier of the first performance data matches the application instance identifier of the second performance data, and determining that the session identifier of the first performance data matches the session identifier of the second performance data.

26. A data intake and query system coupled to a computer network, the data intake and query system comprising:
at least one memory; and
at least one processor coupled to the at least one memory and configured to execute operations that include:
receiving first performance data from a client device on the computer network, the first performance data including at least an application instance identifier, a session identifier, and information related to operation of the client device during a time when a first application encountered an application event related to network communications over the computer network with a host device, the host device being coupled to the computer network;
receiving second performance data from a host device, the second performance data including the application instance identifier, the session identifier, and information related to the operation of the host device during the time when the first application encountered the application event related to network communications with the host device;
identifying, based on at least the application instance identifier and the session identifier, that at least a portion of the first performance data is related to at least a portion of the second performance data;
determining, based on the identifying of the portion of the first performance data as being related to the portion of the second performance data, that the portion of the first performance data is indicative of a performance issue of the computer network; and in response to determining that at least the portion of the first performance data is indicative of the performance issue of the computer network, generating a display that includes:
- a first event that is derived from the first performance data and that corresponds to the time when the first application encountered the application event, and
- a second event that is derived from the second performance data and that corresponds to the time when the first application encountered the application event.

27. The data intake and query system of claim 26, wherein the application event is associated with a network error or performance issue, and wherein the first application causes storage of the first performance data offline for a period of time prior to sending the first performance data to a data intake and query system.

28. The data intake and query system of claim 26, wherein the client device stores the application instance identifier and session identifier in one or more packet headers of a request sent to the host device.

29. The data intake and query system of claim 26, wherein the application event is associated with one or more network errors or performance issues associated with the client device, and wherein the first performance data includes information related to a geographic location of the client device during the time when the first application encountered the application event.

* * * * *